Figure 1:
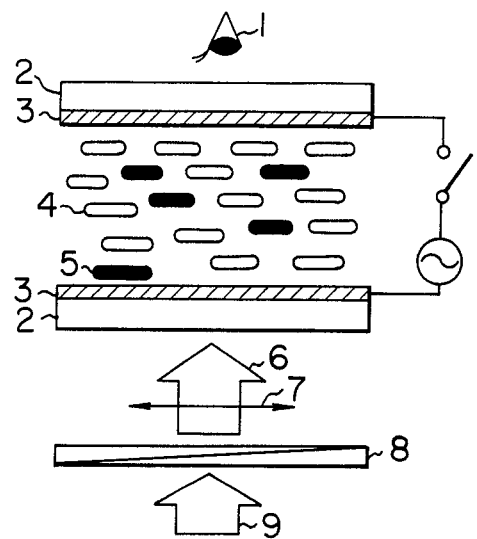

United States Patent [19]

Imazeki et al.

[11] Patent Number: 4,610,804
[45] Date of Patent: Sep. 9, 1986

[54] ANTHRAQUINONE DYES AND LIQUID CRYSTAL COMPOSITIONS INCLUDING THE SAME

[75] Inventors: Shuji Imazeki, Hitachi; Akio Mukoh, Mito; Mikio Sato, Hitachi; Masaharu Kaneko, Yamato; Tetsuo Ozawa, Tokyo; Tomio Yoneyama, Kawasaki, all of Japan

[73] Assignees: Hitachi, Ltd.; Mitsubishi Chemical Industries, both of Tokyo, Japan

[21] Appl. No.: 592,255

[22] Filed: Mar. 22, 1984

[30] Foreign Application Priority Data

Mar. 23, 1983 [JP] Japan .................. 58-48143
Mar. 23, 1983 [JP] Japan .................. 58-48144
Apr. 1, 1983 [JP] Japan .................. 58-58323

[51] Int. Cl.$^4$ .............. C09K 3/34; G02F 1/13; C07C 103/75; C09B 1/36
[52] U.S. Cl. .................. 252/299.1; 260/369; 260/376; 260/377; 260/378; 260/380; 260/381; 260/383; 260/384
[58] Field of Search .............. 350/349; 252/299.1; 260/376, 377, 378, 380, 381, 383, 384, 369

[56] References Cited

U.S. PATENT DOCUMENTS

| | | | |
|---|---|---|---|
| 3,475,173 | 10/1969 | Kimura et al. ............... | 252/299.1 |
| 4,360,447 | 11/1982 | Morinaka et al. ............ | 252/299.1 |
| 4,363,743 | 12/1982 | Moeller et al. .............. | 252/299.1 |
| 4,428,858 | 1/1984 | Cognard et al. ............. | 252/299.1 |
| 4,434,072 | 2/1984 | Imahori et al. .............. | 252/299.1 |
| 4,495,083 | 1/1985 | Imazeki et al. .............. | 252/299.1 |
| 4,505,549 | 3/1985 | Shimidzu et al. ........... | 252/299.1 |
| 4,507,221 | 3/1985 | Imazeki et al. .............. | 252/299.1 |

FOREIGN PATENT DOCUMENTS

| | | | |
|---|---|---|---|
| 25809 | 4/1981 | European Pat. Off. ...... | 252/299.1 |
| 26004 | 4/1981 | European Pat. Off. ...... | 252/299.1 |
| 38460 | 10/1981 | European Pat. Off. ...... | 252/299.1 |
| 54217 | 6/1982 | European Pat. Off. ...... | 252/299.1 |
| 75173 | 3/1983 | European Pat. Off. ...... | 252/299.1 |
| 76633 | 4/1983 | European Pat. Off. ...... | 252/299.1 |
| 93367 | 11/1983 | European Pat. Off. ...... | 252/299.1 |
| 98522 | 1/1984 | European Pat. Off. ...... | 252/299.1 |
| 2614604 | 10/1977 | Fed. Rep. of Germany ... | 252/299.1 |
| 3038372 | 5/1981 | Fed. Rep. of Germany ... | 252/299.1 |
| 1446845 | 9/1965 | France .......................... | 252/299.1 |
| 2017764 | 5/1970 | France .......................... | 252/299.1 |
| 57-92079 | 6/1982 | Japan ............................. | 252/299.1 |
| 54-147575 | 9/1982 | Japan ............................. | 252/299.1 |
| 974404 | 11/1964 | United Kingdom ........... | 252/299.1 |
| 2074182 | 10/1981 | United Kingdom ........... | 252/299.1 |
| 2094825 | 9/1982 | United Kingdom ........... | 252/299.1 |

*Primary Examiner*—Teddy S. Gron
*Attorney, Agent, or Firm*—Antonelli, Terry & Wands

[57] ABSTRACT

A liquid crystal composition comprising a host liquid crystal material and at least one guest novel anthraquine dye dissolved in said host liquid crystal material has a high order parameter, sufficient solubility in the host liquid crystal and high stability.

20 Claims, 4 Drawing Figures

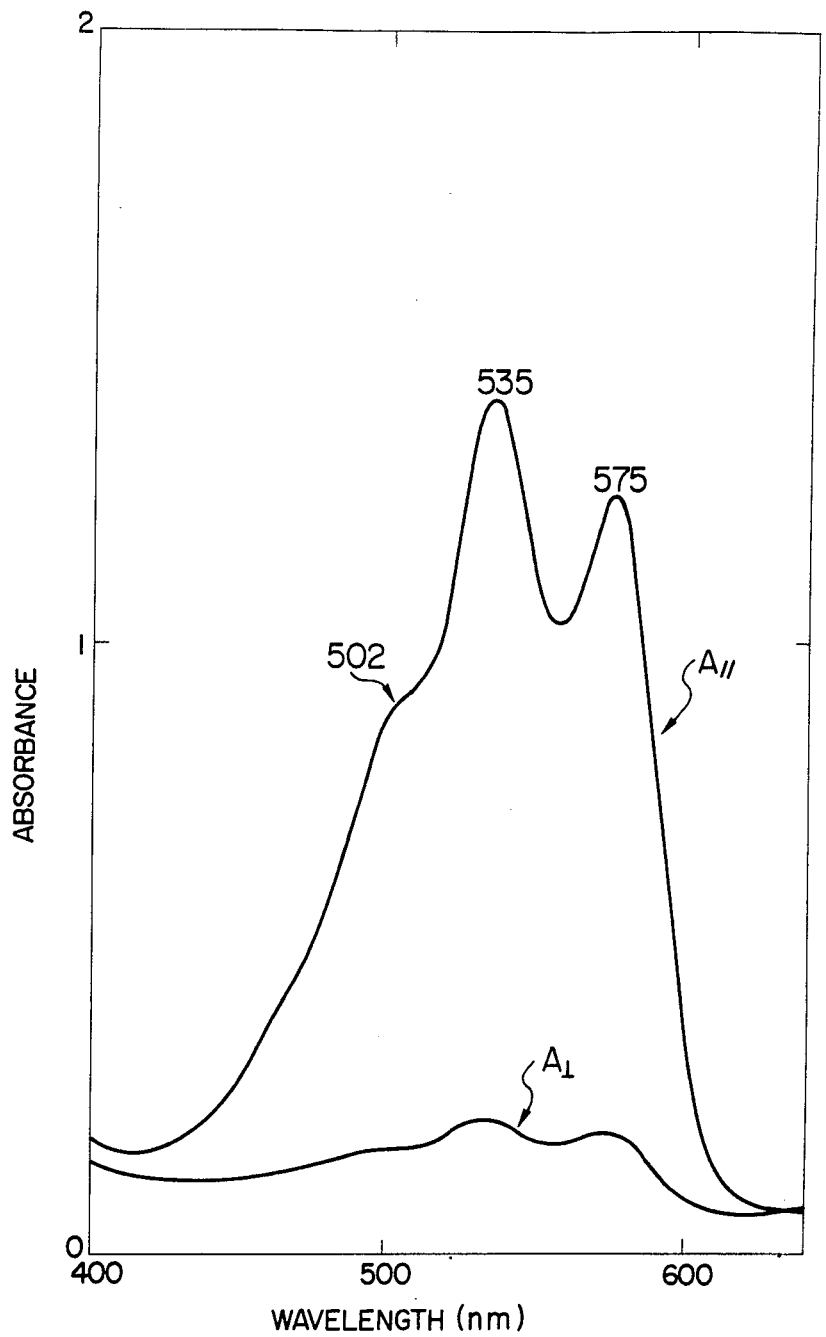

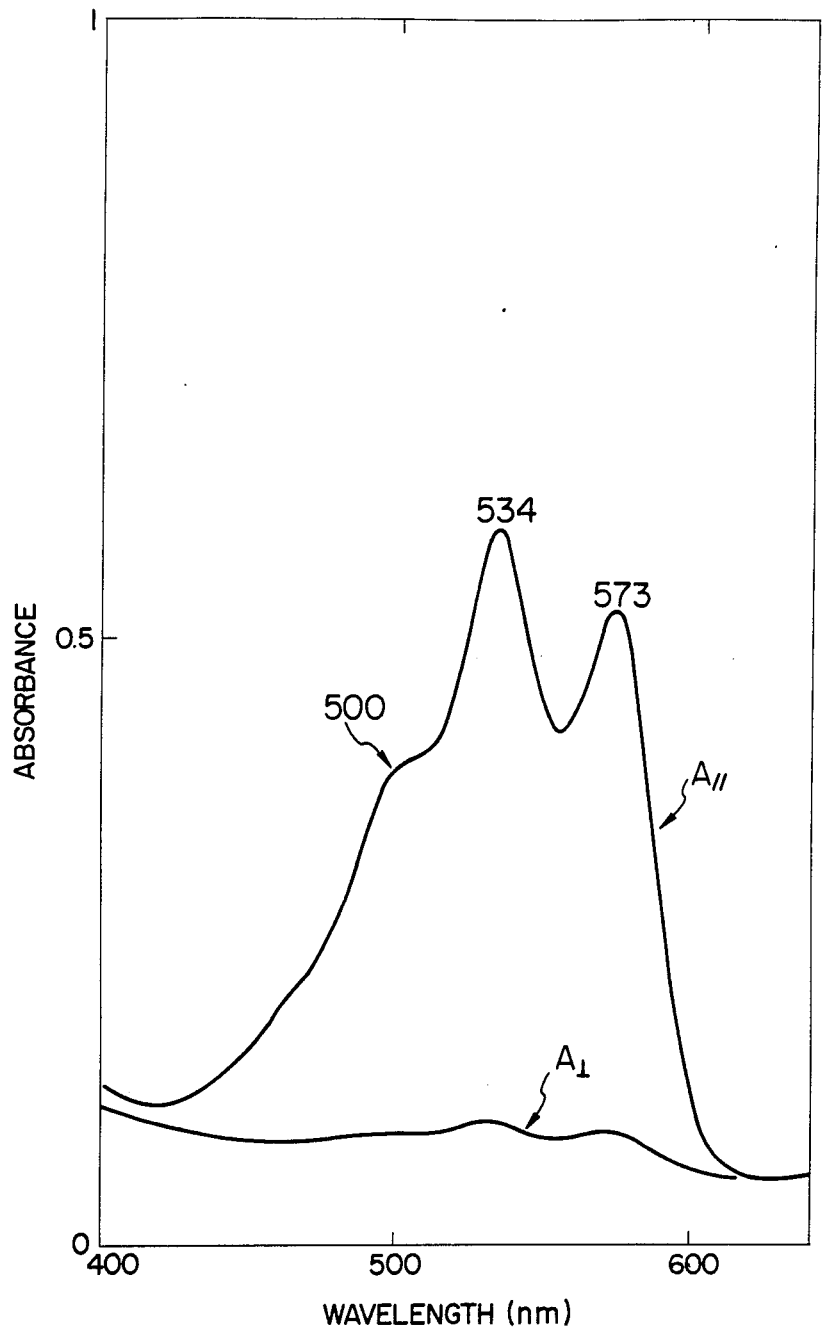

ANTHRAQUINONE DYES AND LIQUID CRYSTAL COMPOSITIONS INCLUDING THE SAME

This invention relates to anthraquinone dyes and liquid crystal compositions including said anthraquinone dyes therein. More in detail, this invention relates to special anthraquinone dyes suitable for use in electro-optical devices which have a liquid crystal composition including at least one dye between two electrode plates placed in opposite to each other and make it possible to provide good color display by using a so-called guest-host effect of the liquid crystal and also relates to liquid crystal compositions containing these anthraquinone dyes.

Pleochroic dyes can be divided into two types. One type of the dyes are those in which the transition moment of visible light absorption is almost parallel to the axis direction of the dye molecule and which, when dissolved as a guest molecule in a host liquid crystal, has a property that the axis of the dye molecule and the direction of the liquid crystal molecules are substantially in the same direction. These dyes are called as those having parallel dichroism (or P-type dyes). The other type of the dyes are those in which transition moment of visible light absorption is almost perpendicular to the molecular axis of the dye molecule and which, when dissolved in a host liquid crystal as a guest, has a property that the axis of the dye molecule and the direction of the liquid crystal molecules are oriented substantially in the same direction. These dyes are called as those having perpendicular dichroism (or N-types dyes). Of these two types, this invention relates to the former type dyes which have parallel dichroism and liquid crystal compositions containing these dyes.

Features of the pleochroic dyes are that the absorption intensity of light of the dye molecule can be determined depending on relative directions of absorption transition moment of the molecule and electric vector of light. That is, when the direction of absorption transition moment is parallel to the electric vector of light, the absorption intensity becomes maximum, while in perpendicular, the absorption intensity becomes minimum.

When a nematic, cholesteric or smectic liquid crystal containing such a pleochroic dye is interposed between two opposed electrode plates and an electric potential is applied across the electrodes, a disturbing movement of the liquid crystal molecules is caused, or a molecular alignment oriented in the direction of electric field is formed, depending on dielectric properties and flowability of the liquid crystal. Under such conditions, the pleochroic dye molecules also move together with the liquid crystal molecules, causing a change in the relative relation between the direction of the absorption transition moment of the pleochroic dye molecules and the direction of incident light. As a result, the liquid crystal display undergoes a change in its light absorption properties. This phenomenon is well known as "guest-host effect", and an electrically controllable color display device can be constructed utilizing this effect.

Figure 2:
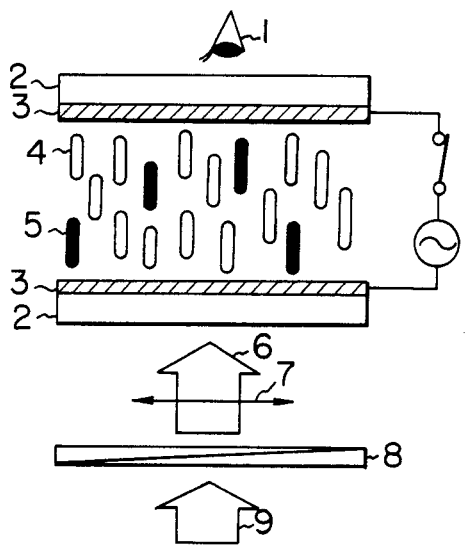

For example, when a nematic liquid crystal having a positive dielectric anisotropy and containing a pleochroic dye showing parallel dichroism is interposed between two transparent electrode plates, the surfaces of which contacting with the liquid crystal have been subjected to homogeneous orientation treatment and which are positioned in parallel to face each other, the liquid crystal molecules form a so-called homogeneous alignment wherein the long axes of the molecules are aligned in a constant direction parallel with the electrode planes. (See FIG. 1.) In this situation, the pleochroic dye molecules dissolved in the liquid crystal molecules 5 are also aligned so that their long axes are also in parallel and constant with the electrode planes. When white light 6, which has travelled in a direction perpendicular to an electrode plane and polarized by a polarizing plate 8 to the same direction as the alignment direction of the liquid crystal, is transmitted through the guest-host material having such an alignment as mentioned above, the electric vector of incident white light is paralleled with the long axes of the pleochroic dye molecules, and hence a specific wavelength region of the incident light is particularly strongly absorbed by the pleochroic dye molecules. As a result, the guest-host material takes a strongly colored state. In the next place, when an electric field is applied to the liquid crystal material in the above-mentioned alignment through the transparent electrode plates 3, since the host liquid crystal has a positive dielectric anisotropy, the host liquid crystal molecules 4 and the guest pleochroic dye molecules 5 take a homeotropic alignment wherein the axes of the molecules are perpendicularly aligned with respect to the electrode planes. (See FIG. 2.) In this invention, since the long axes of the pleochroic dye molecules are perpendicular to the electric vector of incident white polarized light 6, the incident light is hardly absorbed by the pleochroic dye molecules, which results in making the guest-host material appear to be in a weakly colored state. By applying the difference in the strongly colored state and weakly colored state, it becomes possible to provide a display by electrical driving. In FIGS. 1 and 2, numeral 1 denotes an observer, 2 a transparent glass substrate, 7 polarizing directions of incident light and 9 incident natural light.

The pleochroic dyes used as guest in liquid crystal displays applying the above-mentioned guest-host effect are required to have the following properties:

① To have a high order parameter in the host liquid crystal.

② To have a desired hue depending on purposes.

③ To have sufficient solubility in the host liquid crystal.

④ To have high stability (light stability, thermal stability, electrical stability, etc.).

Among these properties, the order parameter (usually expressed by the mark "S") mentioned in ① indicates the degree of parallel of the dye molecule absorption axis against the orientational direction of the host liquid crystal molecules and can be defined as follows:

$$S = \tfrac{1}{2}(3\overline{\cos^2\theta} - 1)$$

In the above equation, the term of $\cos^2\theta$ is timewise averaged and $\theta$ is an angle between the dye molecule absorption axis and the orientational direction of host liquid crystal molecules. The order parameter S of pleochroic dye molecules can be obtained experimentally by the following equation:

$$S = \frac{A_{\parallel} - A_{\perp}}{2A_{\perp} + A_{\parallel}}$$

Wherein $A_{\parallel}$ and $A_{\perp}$ respectively represent absorbances of dye molecules for the light polarized in parallel or perpendicular direction with respect to the orientational direction of the host liquid crystal (director). To speak concretely, the order parameter S is a quantitative measure for controlling display contrast of guest-host liquid crystal display elements. In the case of the pleochroic dyes having parallel dichroism, the closer the order parameter is to 1 which value is the theoretical maximum value, the degree of color retention in relatively colorless portion decreases so as to make possible a bright and clear display with high contrast.

As to the desired hue or coloring mentioned in ②, it is necessary to make the range of hue or coloring which can be selected as wide as possible from the standpoints of coloring the display considering an increase in the amount of display information, an increase in the degree of free for design, and an improvement in decorative properties. Fundamentally, if the three primary colors, i.e., yellow, magenta and cyan, can be obtained, it becomes possible to give all the colors by subtractive color mixing. Thus, the three primary colors of yellow, magenta and cyan become important.

Therefore, the production of pleochroic dyes satisfying the requirements ①, ③ and ④ mentioned above is desired at present.

This invention provides pleochroic dyes satisfying the requirements ①, ③ and ④ and a liquid crystal composition comprising a host liquid crystal material and such anthraquinone dyes dissolved in said host liquid crystal material.

This invention provides an anthraquinone dye having the formula:

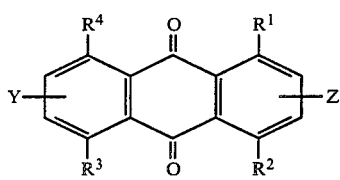

(I)

wherein $R^1$, $R^2$, $R^3$ and $R^4$ are independently hydrogen, a hydroxyl group or —$NHR^7$; $R^7$ is hydrogen, an alkyl group which may be substituted with an alkoxy group, a cycloalkyl group, an aryl group, an aralkyl group or a furfuryl group; Z is —X—$CH_2$—$R^5$ or —$COOR^6$; and in the case of Z being —X—$CH_2$—$R^5$, Y is hydrogen, —X—$CH_2$—$R^5$,

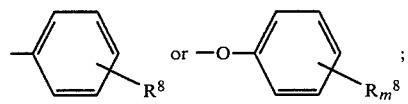

X is sulfur or oxygen; $R^5$ is a trans-4-alkylcyclohexyl group, a trans-4-alkoxycyclohexyl group, a trans-4-cyclohexylcyclohexyl group or a trans-4-alkylcyclohexylcyclohexyl group; $R^8$ is hydrogen, an alkyl group which can be substituted with an alkoxy group, an alkoxy group, a dialkylamino group or a halogen; and m is 1 to 3; and in the case of Z being —$COOR^6$, Y is hydrogen, a halogen, —X—$R^6$,

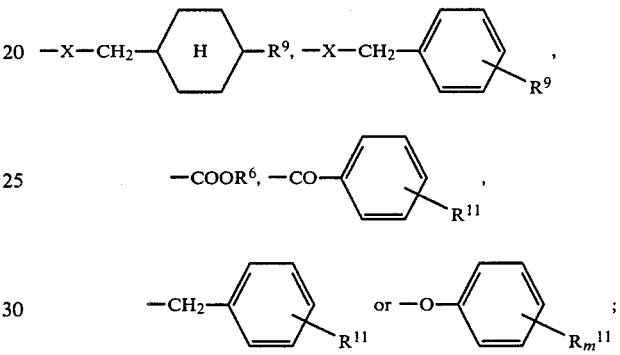

$R^6$ is an alkyl group which may be substituted with an alkoxy group,

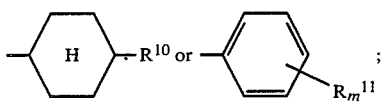

X is sulfur or oxygen; $R^9$ is hydrogen, an alkyl group which may be substituted with an alkoxy group, or an alkoxy group; $R^{10}$ is hydrogen, an alkyl group, an alkoxy group, or a cycloalkyl group which may be substituted with an alkyl group; $R^{11}$ is hydrogen, an alkyl group which may be substituted with an alkoxy group, an alkoxy group,

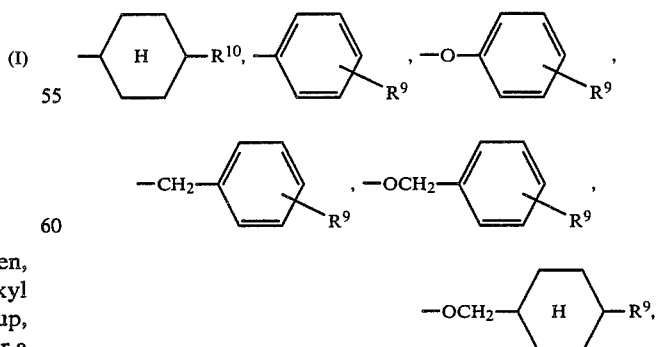

a halogen, a cyano group or a dialkylamino group; and m is 1 to 3.

This invention also provides a liquid crystal composition comprising a host liquid crystal material and at least one guest anthraquinone dye dissolved in said host liquid crystal material, said anthraquinone dye having the formula:

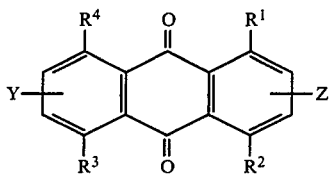 (I)

wherein $R^1$, $R^2$, $R^3$, $R^4$, Y and Z are as defined above.

In the attached drawings, FIG. 1 is a schematic sectional view of a display cell used in this invention in a non-voltage applied state, FIG. 2 is a schematic sectional view of a display cell used in this invention in a voltage applied state, and FIGS. 3 and 4 show spectral properties of liquid crystal compositions according to this invention.

Among the anthraquinone dyes of the formula (I), when Z is $X-CH_2-R^5$, preferred ones are those represented by the formula:

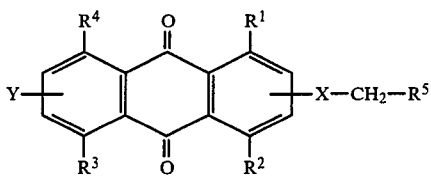 (II)

wherein $R^1$, $R^2$, $R^3$ and $R^4$ are independently hydrogen, a hydroxyl group or an amino group; X is sulfur or oxygen; $R^5$ is a trans-4-alkylcyclohexyl group, a trans-4-alkoxycyclohexyl group, a trans-4-cyclohexylcyclohexyl group or a trans-4-alkylcyclohexylcyclohexyl group; Y is hydrogen, $-X-CH_2-R^5$,

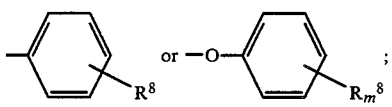

$R^8$ is hydrogen, a $C_{1-12}$ alkyl group which may be substituted with an alkoxy group, a $C_{1-12}$ alkoxy group, a dialkylamino group or a halogen; and m is 1 to 3.

The anthraquinone dyes of the formula (II) have good solubility in a host liquid crystal, show good order parameter and give a display excellent in contrast.

Among the anthraquinone dyes of the formula (II), those of the formula (III) to (XVII) mentioned below are more preferable. In the formula (III) to (XVII), X, $R^5$ and $R^8$ are as defined above.

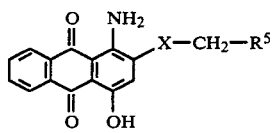 (III)

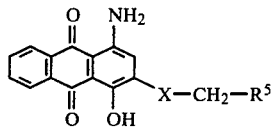 (IV)

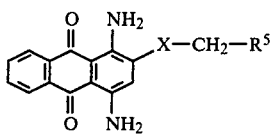 (V)

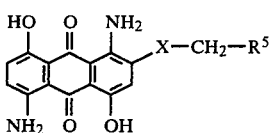 (VI)

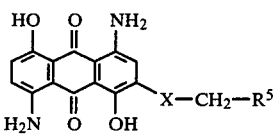 (VII)

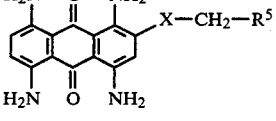 (VIII)

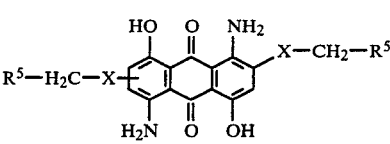 (IX)

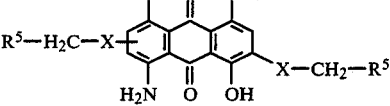 (X)

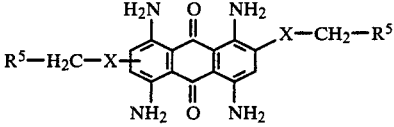 (XI)

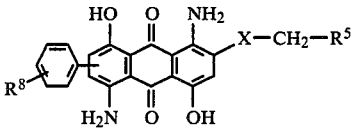 (XII)

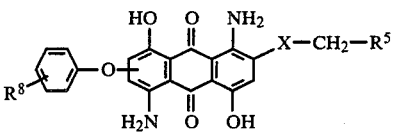 (XIII)

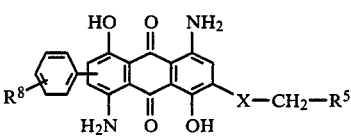 (XIV)

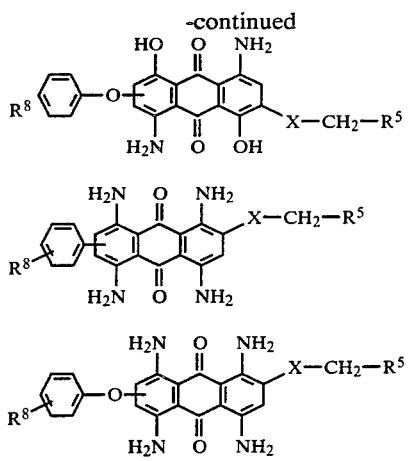

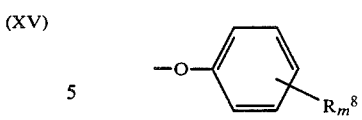

Examples of the substituents represented by $R^5$ are trans-4-alkylcyclohexyl groups such as a trans-4-methylcyclohexyl group, a trans-4-ethylcyclohexyl group, a trans-4-n-propylcyclohexyl group, a trans-4-n-butylcyclohexyl group, a trans-4-n-pentylcyclohexyl group, a trans-4-n-hexylcyclohexyl group, a trans-4-n-hepthylcyclohexyl group, a trans-4-n-octylcyclohexyl group, etc.; trans-4-alkoxycyclohexyl groups such as a trans-4-n-propyloxycyclohexyl group, a trans-4-n-pentyloxycyclohexyl group, a trans-4-n-heptyloxycyclohexyl group, etc.; a trans-4-cyclohexylcyclohexyl group; trans-4-alkylcyclohexylcyclohexyl groups such as a trans-4-n-propylcyclohexylcyclohexyl group, a trans-4-n-pentylcyclohexylcyclohexyl group, a trans-4-n-heptylcyclohexylcyclohexyl group, etc.

Examples of

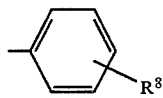

are aryl groups such as a 4-methoxyphenyl group, a 2-ethylphenyl group, a 4-ethylphenyl group, a 4-ethoxyphenyl group, a 2-isopropylphenyl group, a 4-n-propylphenyl group, a 4-n-propoxyphenyl group, a 4-n-butylphenyl group, a 4-n-butoxyphenyl group, a 4-isobutoxyphenyl group, a 4-sec-butoxyphenyl group, a 4-n-pentylphenyl group, a 4-n-pentyloxyphenyl group, a 4-isopentyloxyphenyl group, a 4-sec-pentyloxyphenyl group, a 4-tert-pentyloxyphenyl group, a 4-n-hexylphenyl group, a 4-n-hexyloxyphenyl group, a 4-n-heptylphenyl group, a 4-n-heptyloxyphenyl group, a 4-n-octylphenyl group, a 4-n-octyloxyphenyl group, a 4-n-nonylphenyl group, a 4-n-nonyloxyphenyl group, a 4-n-decylphenyl group, a 4-n-decyloxyphenyl group, a 4-n-dodecylphenyl group, a 4-n-dodecyloxyphenyl group, a 2-chlorophenyl group, a 3-chlorophenyl group, a 4-chlorophenyl group, a 2-bromophenyl group, a 3-bromophenyl group, a 4-bromophenyl group, a 2-fluorophenyl group, a 3-fluorophenyl group, a 4-fluorophenyl group, a 2-iodophenyl group, a 3-iodophenyl group, a 4-iodophenyl group, etc.

Examples of

are aryloxy groups such as a phenoxy group, a 2-methylphenoxy group, a 3-methylphenoxy group, a 4-methylphenoxy group, a 2-methoxyphenoxy group, a 3-methoxyphenoxy group, a 4-methoxyphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2,3,5-trimethylphenoxy group, a 3,4,5-trimethylphenoxy group, a 2-ethylphenoxy group, a 3-ethylphenoxy group, a 4-ethylphenoxy group, a 2-ethoxyphenoxy group, a 3-ethoxyphenoxy group, a 4-ethoxyphenoxy group, a 2-n-propylphenoxy group, a 3-isopropylphenoxy group, a 4-n-propylphenoxy group, a 4-isopropylphenoxy group, a 4-n-propoxyphenoxy group, a 4-n-butylphenoxy group, a 2-sec-butylphenoxy group, a 4-sec-butylphenoxy group, a 3-n-butoxyphenoxy group, a 4-sec-butoxyphenoxy group, a 4-n-pentylphenoxy group, a 4-n-pentyloxyphenoxy group, a 4-n-hexylphenoxy group, a 4-n-hexyloxyphenoxy group, a 4-n-heptylphenoxy group, a 4-n-hepthyloxyphenoxy group, a 4-n-octylphenoxy group, a 4-n-octyloxyphenoxy group, a 4-n-nonylphenoxy group, a 2-chlorophenoxy group, a 3-chlorophenoxy group, a 4-chlorophenoxy group, a 4-chloro-3-methylphenoxy group, a 4-chloro-3,5-dimethylphenoxy group, a 2-bromophenoxy group, a 3-bromophenoxy group, a 4-bromophenoxy group, a 4-iodophenoxy group, a 2-fluorophenoxy group, a 3-fluorophenoxy group, a 4-fluorophenoxy group, a 4-ethoxymethylphenoxy group, a 4-(n-propoxy)-methylphenoxy group, an N,N-dimethyl-3-aminophenoxy group, etc.

The anthraquinone dye of the formula (II) can easily be synthesized by alkylating a compound of the formula:

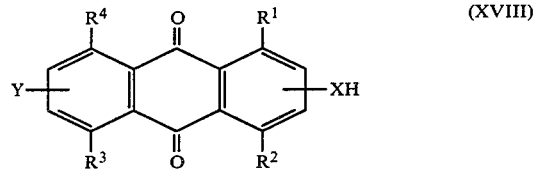

wherein $R^1$, $R^2$, $R^3$, $R^4$, X and Y are as defined above, with a compound of the formula:

$$A-CH_2-R^5$$

wherein A is a halogen; and $R^5$ is as defined above, or

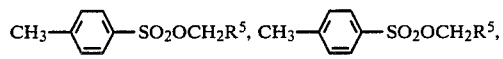

or the like by a conventional method.

Among the anthraquinone dyes of the formula (I), when Z is —COOR⁶, preferred ones are those represented by the formula:

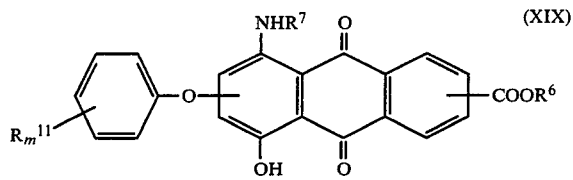

wherein $R^7$ is hydrogen, an alkyl group, a cycloalkyl group, an aryl group or an aralkyl group; $R^6$ is a $C_{1-9}$ alkyl group which may be substituted with an alkoxy group,

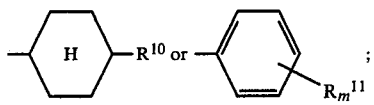

$R^{10}$ is hydrogen, a $C_{1-9}$ alkyl group, a $C_{1-9}$ alkoxy group, a cycloalkyl group which may be substituted with an alkyl group; $R^{11}$ is hydrogen, a $C_{1-9}$ alkyl group which may be substituted with an alkoxy group, a $C_{1-9}$ alkoxy group,

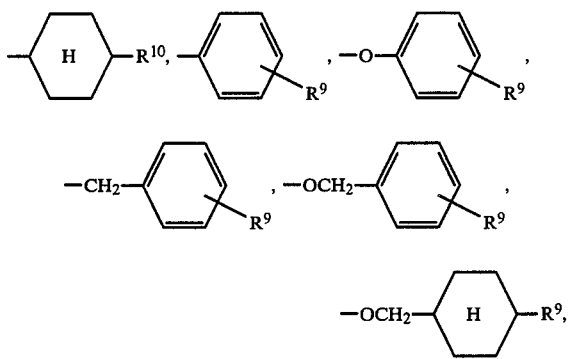

a halogen or a dialkylamino group; $R^9$ is hydrogen, a $C_{1-9}$ alkyl group which may be substituted with an alkoxy group, or a $C_{1-9}$ alkoxy group; and m is 1 to 3.

In the definition of $R^7$, the term "aryl" includes

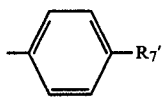

wherein $R_7'$ is hydrogen, a $C_{1-9}$ alkyl group which may be substituted with an alkoxy group, a $C_{1-9}$ alkoxy group, a cycloalkyl group which may be substituted with an alkyl group, and the term "aralkyl" includes

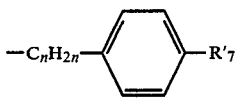

wherein $R_7'$ is as defined above, and n is an integer of 1 to 9.

The anthraquinone dyes of the formula (XIX) have good solubility in a host liquid crystal, show good order parameter and give a display excellent in contrast.

Examples of $R^7$ in the —$NHR^7$ moiety are a hydrogen atom; alkyl groups such as a methyl group, an ethyl group; a n-propyl group, an isopropyl group, a n-butyl group, an isobutyl group, a sec-butyl group, a tert-butyl group, a n-pentyl group, a n-hexyl group, a n-heptyl group, a n-octyl group, etc.; cyclohexyl groups such as a cyclohexyl group, a 4-methylcyclohexyl group, a 4-ethylcyclohexyl group, a 4-propylcyclohexyl group, a 4-butylcyclohexyl group, a 4-pentylcyclohexyl group, a 4-hexylcyclohexyl group, a 4-heptylcyclohexyl group, a 4-octylcyclohexyl group, a cycloheptyl group, etc.; aryl groups such as a p-tolyl group, a p-n-propylphenyl group, a p-n-butylphenyl group, a p-n-pentylphenyl group, a p-n-hexylphenyl group, a p-n-octylphenyl group, a p-methoxyphenyl group, a p-ethoxyphenyl group, a p-n-propoxyphenyl group, a p-n-butoxyphenyl group, p-n-pentyloxyphenyl group, a p-n-butoxymethylphenyl group, ect.; aralkyl groups such as a benzyl group; a 2-phenylethyl group, a 3-phenylpropyl group, etc.

Examples of

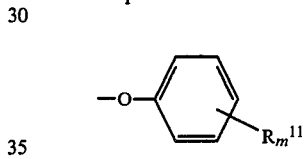

are a phenoxy group, a 2-methylphenoxy group, a 3-methylphenoxy group, a 4-methylphenoxy group, a 2-methoxyphenoxy group, a 3-methoxyphenoxy group, a 4-methoxyphenoxy group, a 2,3-dimethylphenoxy group, a 2,4-dimethylphenoxy group, a 2,5-dimethylphenoxy group, a 2,6-dimethylphenoxy group, a 3,4-dimethylphenoxy group, a 3,5-dimethylphenoxy group, a 2,3,5-trimethylphenoxy group, a 3,4,5-trimethylphenoxy group, a 2-ethylphenoxy group, a 3-ethylphenoxy group, a 4-ethylphenoxy group, a 2-ethoxyphenoxy group, a 3-ethoxyphenoxy group, a 4-ethoxyphenoxy group, a 2-n-propylphenoxy group, a 3-isopropylphenoxy group, a 4-n-propylphenoxy group, a 4-isopropylphenoxy group, a 4-n-propoxyphenoxy group, a 4-n-butylphenoxy group, a 2-sec-butylphenoxy group, a 4-sec-butylphenoxy group, a 3-n-butoxyphenoxy group, a 4-n-butoxyphenoxy group, a 4-n-pentylphenoxy group, a 4-n-pentyloxyphenoxy group, a 4-n-hexylphenoxy group, a 4-n-hexyloxyphenoxy group, a 4-n-heptylphenoxy group, a 4-n-heptyloxyphenoxy group, a 4-n-octylphenoxy group, a 4-n-octyloxyphenoxy group, a 4-n-nonylphenoxy group, a 2-chlorophenoxy group, a 3-chlorophenoxy group, a 4-chlorophenoxy group, a 4-chloro-3-methylphenoxy group, a 4-chloro-3,5-dimethylphenoxy group, a 2-bromophenoxy group, a 3-bromophenoxy group, a 4-bromophenoxy group, a 4-iodophenoxy group, a 2-fluorophenoxy group, a 3-fluorophenoxy group, a 4-fluorophenoxy group, a 4-ethoxymethylphenoxy group, a 4-n-propoxymethylphenoxy group, a N,N-dimethyl-3-aminophenoxy group, a p-(trans-4-n-propylcyclohexyl)phenoxy group, a p-(trans-4-n-pentylcyclohexyl)phenoxy group, a p-(trans-4-n-heptylcyclohexyl)phenoxy group, a p-(p'-n-propylphenyl)phenoxy group, a p-(p'-n-pentylphenyl)phenoxy group, a p-(p'-ethoxyphenyl)phenoxy group, a p-(p'-n-pentyloxyphenyl)phenoxy group, a p-phenoxyphenoxy group, a p-(p'-n-butylphenoxy)phenoxy group, a p-benzylphenoxy group, a p-(p'-n-butylbenzyl)phenoxy group, a p-(p'-n-butylbenzyloxy)phenoxy group, a p-(p'-n-butoxybenzyloxy)phenoxy group, a p-(p'-n-heptyloxybenzyloxy)phenoxy group, a p-(trans-4-n-propylcyclohexylmethoxy)phenoxy group, a p-(trans-4-n-pentylcyclohexylmethoxy)phenoxy group, a p-(trans-4-n-hepthylcyclohexylmethoxy)phenoxy group, etc.

Examples of $R^6$ in the —$COOR^6$ moiety are alkyl groups such as a methyl group, an ethyl group, a n-propyl group, an isopropyl group, a n-butyl group, an isobutyl group, a sec-butyl group, a n-amyl group, a n-hexyl group, a n-heptyl group, a n-octyl group, a n-nonyl group, etc.; alkoxyalkyl groups such as a 2-methoxyethyl group, a 2-ethoxyethyl group, a 2-n-propoxyethyl group, a 2-n-butoxyethyl group, etc.; cyclohexyl groups such as a cyclohexyl group, a trans-4-methylcyclohexyl group, a trans-4-ethylcyclohexyl group, a trans-4-n-propylcyclohexyl group, a trans-4-n-butylcyclohexyl group, a trans-4-tert-butylcyclohexyl group, a trans-4-n-pentylcyclohexyl group, a trans-4-n-hexylcyclohexyl group, a trans-4-n-heptylcyclohexyl group, a trans-4-n-octylcyclohexyl group, a trans-4-n-propoxycyclohexyl group, a trans-4-n-butoxycyclohexyl group, a trans-4-n-pentyloxycyclohexyl group, a trans-4-n-heptyloxycyclohexyl group, a trans-4-n-cyclohexylcyclohexyl group, a trans-trans-4-n-propylcyclohexylcyclohexyl group, a trans-trans-4-n-pentylcyclohexylcyclohexyl group, a trans-trans-4-n-heptylcyclohexylcyclohexyl group, etc.; a phenyl group, a 2-methylphenyl group, a 3-methylphenyl group, a 4-methylphenyl group, a 2-methoxyphenyl group, a 3-methoxyphenyl group, a 4-methoxyphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 2,3,5-trimethylphenyl group, a 3,4,5-trimethylphenyl group, a 2-ethylphenyl group, a 3-ethylphenyl group, a 4-ethylphenyl group, a 2-ethoxyphenyl group, a 3-ethoxyphenyl group, a 4-ethoxyphenyl group, a 2-n-propylphenyl group, a 3-isopropylphenyl group, a 4-n-propylphenyl group, a 4-isopropylphenyl group, a 4-n-propoxyphenyl group, a 4-n-butylphenyl group, a 2-sec-butylphenyl group, a 4-sec-butylphenyl group, a 3-n-butoxyphenyl group, a 4-n-butoxyphenyl group, a 4-n-pentylphenyl group, a 4-n-pentyloxyphenyl group, a 4-n-hexylphenyl group, a 4-n-hexyloxyphenyl group, a 4-n-heptylphenyl group, a 4-n-hepthyloxyphenyl group, a 4-n-octylphenyl group, a 4-n-octyloxyphenyl group, a 4-n-nonylphenyl group, a 2-chlorophenyl group, a 3-chlorophenyl group, a 4-chlorophenyl group, a 4-chloro-3-methylphenyl group, a 4-chloro-3,5-dimethylphenyl group, a 2-bromophenyl group, a 3-bromophenyl group, a 4-bromophenyl group, a 4-iodophenyl group, a 2-fluorophenyl group, a 3-fluorophenyl group, a 4-fluorophenyl group, a 4-ethoxymethylphenyl group, a 4-n-propoxymethylphenyl group, a N,N-dimethyl-3-aminophenyl group, a p-(trans-4-n-propylcyclohexyl)phenyl group, a p-(trans-4-n-pentylcyclohexyl)phenyl group, a p-(trans-4-n-heptylcyclohexyl)phenyl group, a p-(p'-n-propylphenyl)phenyl group, a p-(p'-n-pentylphenyl)phenyl group, a p-(p'-ethoxyphenyl)phenyl group, a p-(p'-n-pentyloxyphenyl)phenyl group, a p-phenoxyphenyl group, a p-(p'-n-butylphenoxy)phenyl group, a p-(p'-n-butylbenzyl)phenyl group, a p-(p'-n-butylbenzyloxy)phenyl group, a p-(p'-n-butoxybenzyloxy)phenyl group, a p-(p'-n-heptyloxybenzyloxy)phenyl group, a p-(trans-4-n-propylcyclohexylmethoxy)phenyl group, a p-(trans-4-n-pentylcyclohexylmethoxy)phenyl group, a p-(trans-4-n-hepthylcyclohexylmethoxy)phenyl group, etc.

Among the anthraquinone dyes of the formula (XIX), those of the formulae (XX) and (XXI) mentioned below are more preferable.

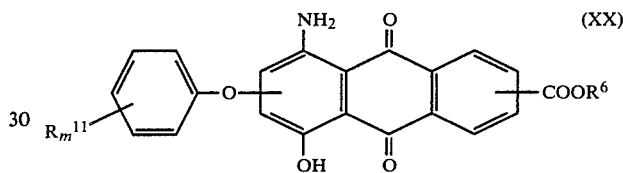
(XX)

wherein $R^{11}$ is a $C_{1-9}$ alkyl group which can be substituted with an alkoxy group, a $C_{1-9}$ alkoxy group,

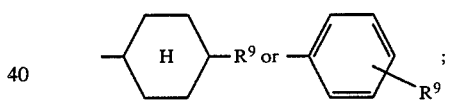

and $R^6$, $R^9$ and m are as defined above.

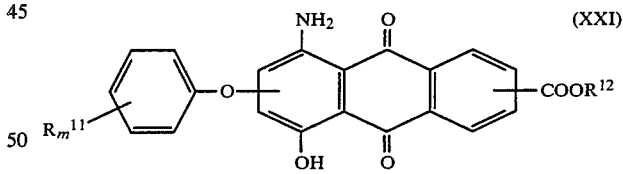
(XXI)

wherein m is 1 to 3; $R^{11}$ is a $C_{1-9}$ alkyl group which can be substituted with an alkoxy group, or a $C_{1-9}$ alkoxy group; $R^{12}$ is

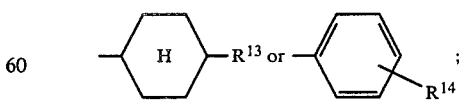

$R^{13}$ is a $C_{1-9}$ alkyl group; and $R^{14}$ is a $C_{1-9}$ alkyl group which can be substituted with an alkoxy group, or a $C_{1-9}$ alkoxy group.

The anthraquinone dye of the formula (XIX) can be synthesized, for example, as follows:

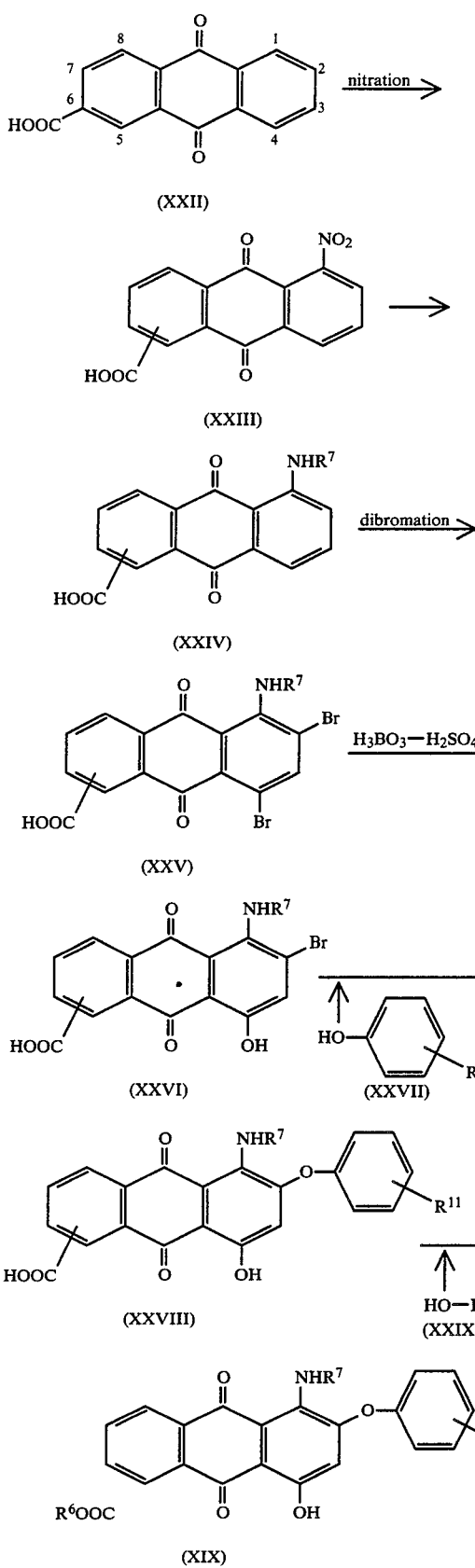

(XXII)

(XXIII)

(XXIV)

(XXV)

(XXVI) (XXVII)

(XXVIII) (XXIX)

(XIX)

In the formulae (XIX) and (XXII) to (XXIX), $R^7$, $R^{11}$ and $R^6$ are as defined above. In the nitration of the compound of the formula (XXII), there are produced two isomers having a carboxyl group at the 6-position or at the 7-position. Thus, there are also produced two isomers of the desired compound of the formula (XIX) having a carboxylic acid ester group at the 6 or 7 position. These isomers can be used as a mixture thereof, or can be separated by column chromatography, recrystallization or the like technique to use the separated isomers alone. In the starting compound of the formula (XXII), when two isomers thereof are separated and used alone as a starting material, each isomers of the final anthraquinone dye of the formula (XIX) can be produced.

Among the anthraquinone dyes of the formula (I), when Z is —COOR$^6$, preferred ones are those represented by the formula:

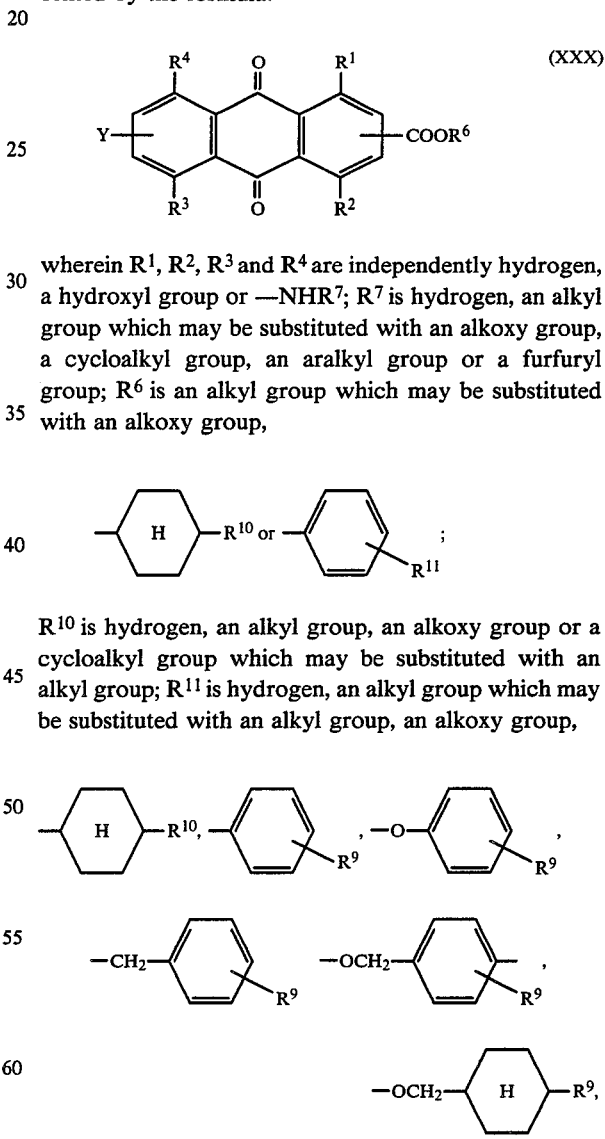

(XXX)

wherein $R^1$, $R^2$, $R^3$ and $R^4$ are independently hydrogen, a hydroxyl group or —NHR$^7$; $R^7$ is hydrogen, an alkyl group which may be substituted with an alkoxy group, a cycloalkyl group, an aralkyl group or a furfuryl group; $R^6$ is an alkyl group which may be substituted with an alkoxy group, $R^{10}$ is hydrogen, an alkyl group, an alkoxy group or a cycloalkyl group which may be substituted with an alkyl group; $R^{11}$ is hydrogen, an alkyl group which may be substituted with an alkyl group, an alkoxy group, a halogen, a cyano group or a dialkylamino group; $R^9$ is hydrogen, an alkyl group which may be substituted with an alkoxy group, or an alkoxy group; Y is hydrogen, halogen, —X—R$^6$,

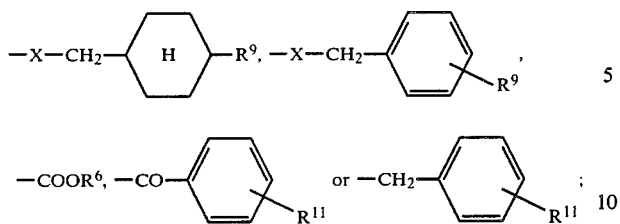

X is sulfur or oxygen. The term "aralkyl" is as defined above.

The anthraquinone dyes of the formula (XXX) have good solubility in a host liquid crystal, show good order parameter and give a display excellent in contrast.

Among the anthraquinone dyes of the formula (XXX), those of the formulae (XXXI) and (XXXII) mentioned below are more preferable:

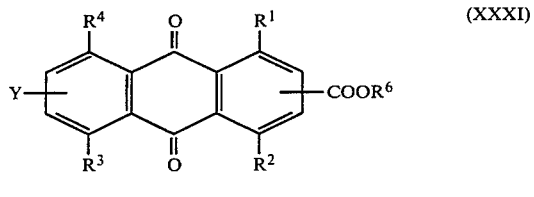
(XXXI)

wherein $R^1$, $R^2$, $R^3$ and $R^4$ are independently a hydroxyl group or $-NHR^7$; $R^7$ is hydrogen, an alkyl group which can be substituted with an alkoxy group, a cycloalkyl group, an aralkyl group or a furfuryl group; $R^6$ is a $C_{1-18}$ alkyl group which can be substituted with an alkoxy group,

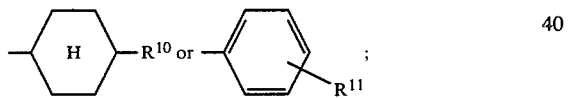

$R^{10}$ is hydrogen, a $C_{1-18}$ alkyl group, a $C_{1-18}$ alkoxy group, or a cycloalkyl group which can be substituted with an alkyl group; $R^{11}$ is hydrogen, a $C_{1-18}$ alkyl group which can be substituted with an alkoxy group, a $C_{1-18}$ alkoxy group,

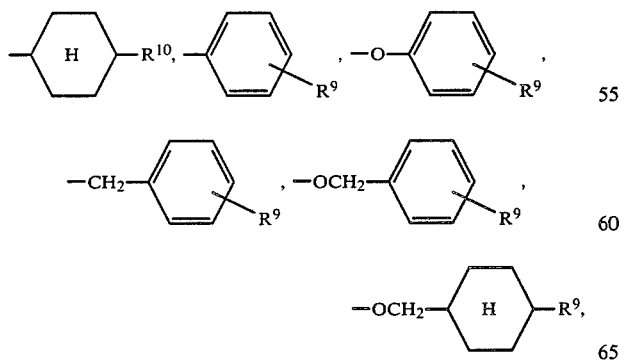

a halogen, a cyano group or a dialkylamino group; $R^9$ is hydrogen, a $C_{1-18}$ alkyl group which can be substituted with an alkoxy group, or a $C_{1-18}$ alkoxy group; Y is hydrogen, a halogen, $-X-R^6$,

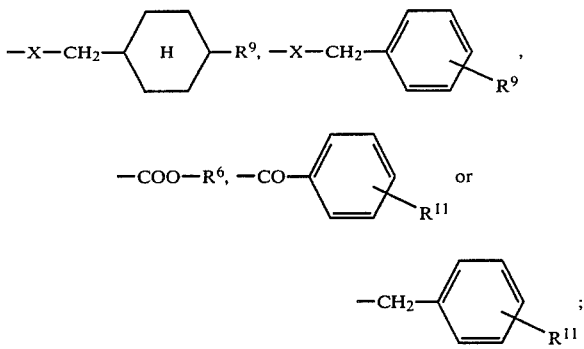

X is sulfur or oxygen; provided that $R^1$, $R^2$, $R^3$ and $R^4$ cannot be hydrogen at the same time. Particularly, $-NHR^7$ being an amino group is preferable.

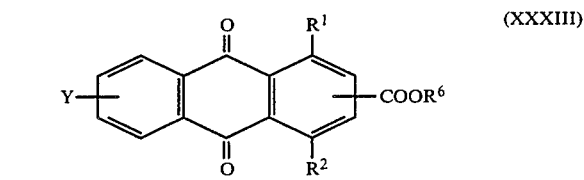
(XXXIII)

wherein $R^1$ and $R^2$ are independently a hydroxyl group or $-NHR^7$; $R^7$ is hydrogen, an alkyl group which can be substituted with an alkoxy group, a cycloalkyl group, an aralkyl group or a furfuryl group; $R^6$ is a $C_{1-18}$ alkyl group which can be substituted with an alkoxy group,

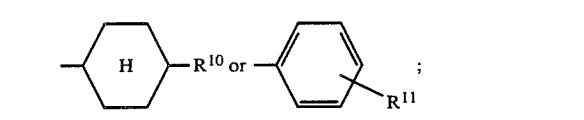

$R^{10}$ is hydrogen, a $C_{1-18}$ alkyl group, a $C_{1-18}$ alkoxy group, or a cycloalkyl group which can be substituted with an alkyl group; $R^{11}$ is hydrogen, a $C_{1-18}$ alkyl group which can be substituted with an alkoxy group, a $C_{1-18}$ alkoxy group,

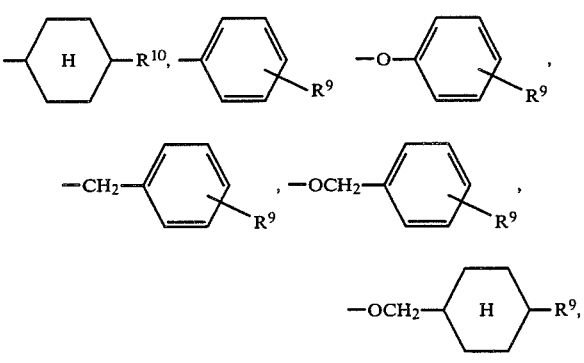

a halogen, a cyano group or a dialkylamino group; $R^9$ is hydrogen, a $C_{1-18}$ alkyl group which can be substituted with an alkoxy group, or a $C_{1-18}$ alkoxy group; Y is a halogen, $-X-R^6$,

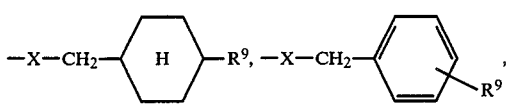

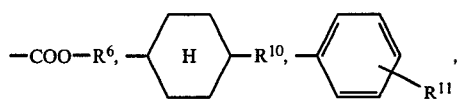

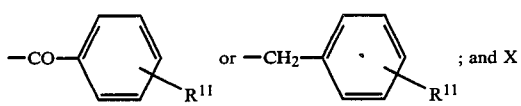; and X and X is oxygen or sulfur.

The anthraquinone dye of the formula (XXXI) can be synthesized, for example, by a process analogous to a conventional method as shown below.

(i) When Y is $-COOR^6$:

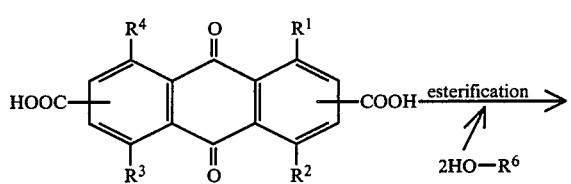

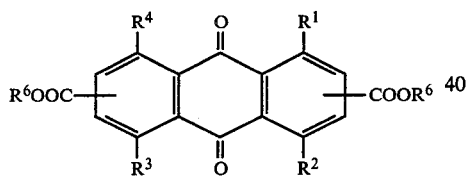

(ii) When Y is other than $-COOR^6$:

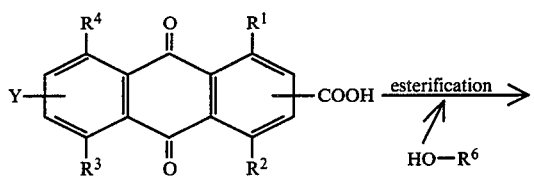

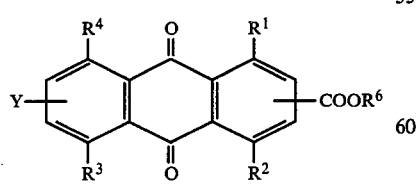

The anthraquinone dye of the formula (XXXII) can be synthesized, for example, by a conventional method as shown below.

(i) When Y is $-COOR^6$:

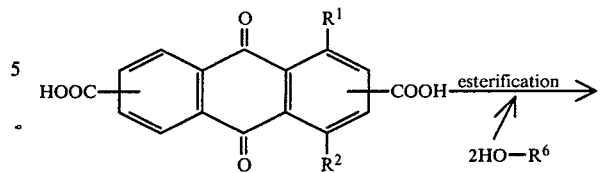

(ii) When Y is other than $-COOR^6$:

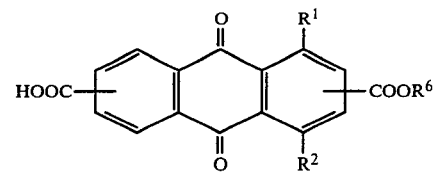

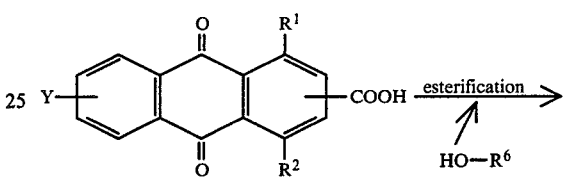

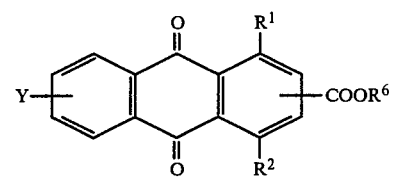

Among the anthraquinone dyes of the formula (XXXI), the following compounds are particularly more preferable. Y, $R^6$ and $R^7$ in the following formulae are as defined above.

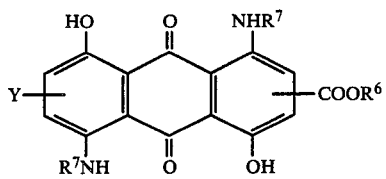

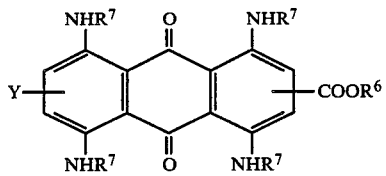

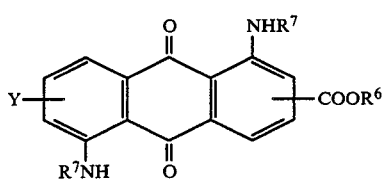

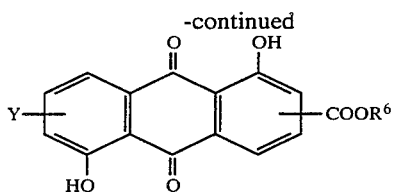

Among the anthraquinone dyes of the formula (XXXII), the following compounds are particularly more preferable. Y, $R^6$ and $R^7$ in the following formulae are as defined above.

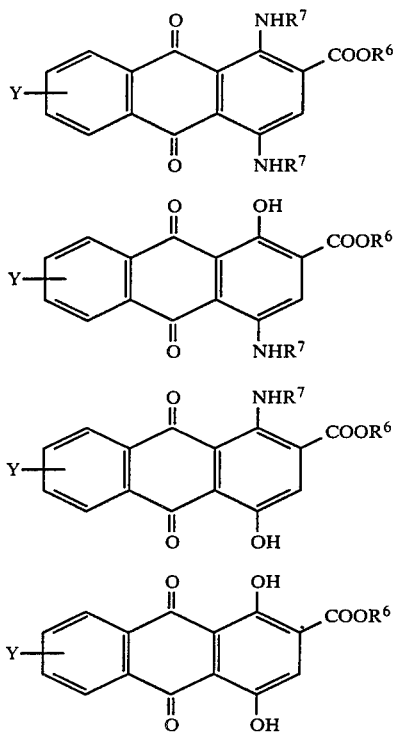

Examples of alkyl groups in the definition of $R^6$ in the —$COOR^6$ moiety in the formulae (XXX) to (XXXII) are a methyl group, an ethyl group, a n-propyl group, an isopropyl group, a n-butyl group, an isobutyl group, a sec-butyl group, a n-amyl group, a n-hexyl group, a n-heptyl group, a n-octyl group, a n-nonyl group, a n-dodecyl group, a n-pentadecyl group, a n-octadecyl group, a 2-methoxyethyl group, a 2-ethoxyethyl group, a 2-n-propoxyethyl group, a 2-n-butoxyethyl group, etc.

Examples of

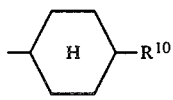

in the definition of $R^6$ in the —$COOR^6$ moiety in the formulae (XXX) to (XXXII) are a cyclohexyl group, a trans-4-methylcyclohexyl group, a trans-4-ethylcyclohexyl group, a trans-4-n-propylcyclohexyl group, a trans-4-n-butylcyclohexyl group, a trans-4-tert-butylcyclohexyl group, a trans-4-n-pentylcyclohexyl group, a trans-4-n-hexylcyclohexyl group, a trans-4-n-heptylcyclohexyl group, a trans-4-n-octylcyclohexyl group, a trans-4-n-propoxycyclohexyl group, a trans-4-n-butoxycyclohexyl group, a trans-4-n-pentyloxycyclohexyl group, a trans-4-n-heptyloxycyclohexyl group, a trans-4-cyclohexylcyclohexyl group, a trans-trans-4-n-propylcyclohexylcyclohexyl group, a trans-trans-4-n-pentylcyclohexylcyclohexyl group, a trans-trans-4-n-heptylcyclohexylcyclohexyl group, etc.

Examples of

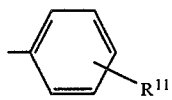

in the definition of $R^6$ in the —$COOR^6$ moiety in the formulae (XXX) to (XXXII) are a phenyl group, a 2-methylphenyl group, a 3-methylphenyl group, a 4-methylphenyl group, a 2-methoxyphenyl group, a 3-methoxyphenyl group, a 4-methoxyphenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 2,3,5-trimethylphenyl group, a 3,4,5-trimethylphenyl group, a 2-ethylphenyl group, a 3-ethylphenyl group, a 4-ethylphenyl group, a 2-ethoxyphenyl group, a 3-ethoxyphenyl group, a 4-ethoxyphenyl group, a 2-n-propylphenyl group, a 3-isopropylphenyl group, a 4-n-propylphenyl group, a 4-isopropylphenyl group, a 4-n-propoxyphenyl group, a 4-n-butylphenyl group, a 2-sec-butylphenyl group, a 4-sec-butylphenyl group, a 3-n-butoxyphenyl group, a 4-n-butoxyphenyl group, a 4-n-pentylphenyl group, a 4-n-pentyloxyphenyl group, a 4-n-hexylphenyl group, a 4-n-hexyloxyphenyl group, a 4-n-heptylphenyl group, a 4-n-heptyloxyphenyl group, a 4-n-octylphenyl group, a 4-n-octyloxyphenyl group, a 4-n-nonylphenyl group, a 2-chlorophenyl group, a 3-chlorophenyl group, a 4-chlorophenyl group, a 4-chloro-3-methylphenyl group, a 4-chloro-3,5-dimethylphenyl group, a 2-bromophenyl group, a 3-bromophenyl group, a 4-bromophenyl group, a 4-iodophenyl group, a 2-fluorophenyl group, a 3-fluorophenyl group, a 4-fluorophenyl group, a 4-ethoxymethylphenyl group, a 4-propoxymethylphenyl group, a 4-cyanophenyl group, a N,N-dimethyl-3-aminophenyl group, a 4-n-dodecyloxyphenyl group, a 4-n-pentadecyloxyphenyl group, a p-(trans-4-n-propylcyclohexyl)phenyl group, a p-(trans-4-n-pentylcyclohexyl)phenyl group, a p-(trans-4-n-heptylcyclohexyl)phenyl group, a p-(p'-n-propylphenyl)phenyl group, a p-(p'-n-pentylphenyl)phenyl group, a p-(p-ethoxyphenyl)phenyl group, a p-(p'-n-pentyloxyphenyl)phenyl group, a p-phenoxyphenyl group, a p-(p'-n-butylphenoxy)phenyl group, a p-benzylphenyl group, a p-(p'-n-butylbenzyl)phenyl group, a p-(p'-n-butylbenzyloxy)phenyl group, a p-(p'-n-butoxybenzyloxy)phenyl group, a p-(p'-n-heptyloxybenzyloxy)phenyl group, a p-(trans-4-n-propylcyclohexylmethoxy)phenyl group, a p-(trans-4-n-pentylcyclohexylmethoxy)phenyl group, a p-(trans-4-n-heptylcyclohexylmethoxy)phenyl group, etc.

Examples of R⁷ in the —NHR⁷ moiety in the formulae (XXX) to (XXXII) are alkyl groups such as a methyl group, an ethyl group, a n-propyl group, an isopropyl group, a n-butyl group, an isobutyl group, a sec-butyl group, a tert-butyl group, a n-pentyl group, a n-hexyl group, a n-heptyl group, a n-octyl group, a 2-methoxyethyl group, a 2-ethoxyethyl group, a 3-isopropoxypropyl group, etc.; cyclohexyl groups such as a cyclohexyl group, a 4-methylcyclohexyl group, a 4-ethylcyclohexyl group, a 4-propylcyclohexyl group, a 4-butylcyclohexyl group, a 4-pentylcyclohexyl group, a 4-hexylcyclohexyl group, a 4-heptylcyclohexyl group, a 4-octylcyclohexyl group, a cycloheptyl group, etc.; aryl groups such as a p-tolyl group, a p-n-propylphenyl group, a p-n-butylphenyl group, a p-n-pentylphenyl group, a p-n-hexylphenyl group, a p-methoxyphenyl group, an ethoxyphenyl group, a p-n-propoxyphenyl group, a p-n-butoxyphenyl group, a p-n-pentyloxyphenyl group, a p-n-butoxymethylphenyl group, a p-chlorophenyl group, etc.; aralkyl groups such as a benzyl group, a 2-phenylethyl group, a 3-phenyl propyl group, etc.

Examples of —X—R⁶ in the definition of Y in the formulae (XXX) to (XXXII) are alkoxy and alkylmercapto groups such as a methoxy group, an ethoxy group, a n-butoxy group, a n-heptyloxy group, a n-nonyloxy group, a 2-ethoxyethyloxy group, a n-propylmercapto group, a n-butylmercapto group, a sec-butylmercapto group, an isobutylmercapto group, a n-hexylmercapto group, a n-octylmercapto group, etc; cyclohexyloxy and cyclohexylmercapto groups such as a 4-n-propylphenoxy group, a 4-n-propoxyphenoxy group, a p-tolylmercapto group, a 4-n-propylphenylmercapto group, a 4-n-butylphenoxy group, a 4-sec-butylphenoxy group, a 4-n-butoxyphenylmercapto group, a 4-n-hexyloxyphenoxy group, a 4-n-pentyloxyphenylmercapto group, a 4-n-heptylphenylmercapto group, a 4-n-octylphenyloxy group, a 4-n-nonyloxyphenyloxy group, etc.

Examples of

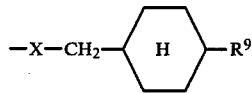

in the definition of Y in the formulae (XXX) to (XXXII) are a trans-4-n-propylcyclohexylmethyloxy group, a trans-4-n-pentylcyclohexylmethyloxy group, a trans-4-n-butylcyclohexylmethyloxy group, a trans-4-n-propylcyclohexylmethylmercapto group, a trans-4-n-pentylcyclohexylmethylmercapto group, etc.

Examples of

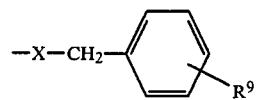

in the definition of Y in the formulae (XXX) to (XXXII) are a benzyloxy group, a p-methoxybenzyloxy group, a p-n-butoxybenzyloxy group, a p-n-butylbenzyloxy group, a p-n-pentyloxybenzyloxy group, a p-n-heptyloxybenzyloxy group, a p-n-benzylmercapto group, a p-n-butoxybenzylmercapto group, a p-n-butylbenzylmercapto group, a p-n-heptyloxybenzylmercapto group, etc.

Examples of

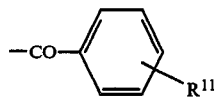

in the definition of Y in the formulae (XXX) to (XXXII) are a p-methylbenzoyl group, a p-methoxybenzoyl group, a p-ethylbenzoyl group, a p-ethoxybenzoyl group, a p-n-butoxybenzoyl group, a p-n-heptyloxybenzoyl group, etc.

Examples of

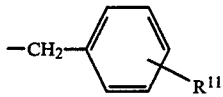

in the definition of Y in the formulae (XXX) to (XXXII) are a p-ethylbenzyl group, a p-n-butylbenzyl group, a p-n-butoxybenzyl group, etc.

As the host liquid crystals usable in this invention, there can be used those which show nematic state in the operation temperature range. These host liquid crystals can be selected from a considerably wide range. Further, these nematic liquid crystals can take a cholesteric state by the addition of one or more optically active substances mentioned below. Examples of the nematic liquid crystals are those shown in Table 1 or their derivatives.

TABLE 1

| No. | Kind | Examples |
|---|---|---|
| 1 | Cyclohexylcyclohexane series | R'—⟨H⟩—⟨H⟩—X' |
| 2 | Phenylcyclohexane series | R'—⟨H⟩—⟨⟩—X' |

TABLE 1-continued

| No. | Kind | Examples |
|-----|------|----------|
| 3 | Biphenyl series | R'—⟨Ph⟩—⟨Ph⟩—X' |
| 4 | Terphenyl series | R'—⟨Ph⟩—⟨Ph⟩—⟨Ph⟩—X' |
| 5 | Cyclohexylcyclohexanoate series | R'—⟨H⟩—COO—⟨H⟩—X' |
| 6 | Phenylcyclohexylcarboxylate series | R'—⟨H⟩—COO—⟨Ph⟩—X' |
| 7 | Ester series | R'—⟨Ph⟩—COO—⟨Ph⟩—X' |
| 8 | Diester series | R'—⟨Ph⟩—COO—⟨Ph⟩—COO—⟨Ph⟩—X' <br> X'—⟨Ph⟩—COO—⟨Ph⟩—COO—⟨Ph⟩—R' |
| 9 | Biphenylcyclohexylcarboxylate series | R'—⟨H⟩—COO—⟨Ph⟩—⟨Ph⟩—X' |
| 10 | Biphenyl ester series | R'—⟨Ph⟩—⟨Ph⟩—COO—⟨Ph⟩—X' <br> X'—⟨Ph⟩—⟨Ph⟩—COO—⟨Ph⟩—R' |
| 11 | Thioester series | R'—⟨Ph⟩—COS—⟨Ph⟩—X' |
| 12 | Schiff base series | R'—⟨Ph⟩—CH=N—⟨Ph⟩—X' <br> X'—⟨Ph⟩—CH=N—⟨Ph⟩—R' |

TABLE 1-continued

| No. | Kind | Examples |
|---|---|---|
| 13 | Pyrimidine series | 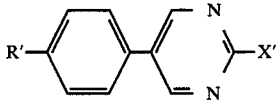 |
| 14 | Dioxane series | 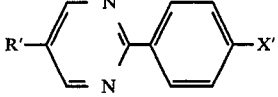 |
| 15 | Cyclohexylmethyl ether series | 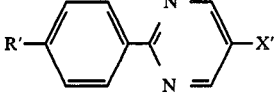 |
| 16 | Cinnamonitrile series |  |

In the above Table 1, R' is an alkyl group or an alkoxy group; and X' is a nitro group, a cyano group, or a halogen atom.

All the liquid crystals in Table 1 have positive dielectric anisotropy. But there can also be used conventional liquid crystals having negative dielectric anisotropy such as ester series, azoxy series, azo series, Schiff base series, pyrimidine series, diester series, and biphenyl ester series by mixed with those having positive dielectric anisotropy to give a mixture having positive dielectric anisotropy as a whole. Needless to say, even liquid crystals having negative dielectric anisotropy can be used as they are if a suitable device constitution and a driving method are used.

As the host liquid crystals, those listed in Table 1 or their derivatives can be used in this invention alone or as a mixture thereof. Among them, particularly preferable liquid crystal mixtures are one marketed by Merck Co., Ltd., under a trade name of ZLI-1132:

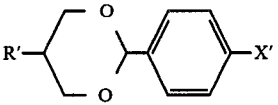 38.4% by weight

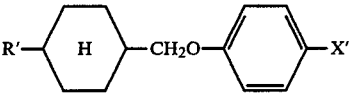 34.2% by weight

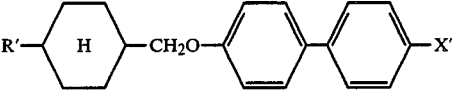 18.1% by weight

 9.3% by weight (the composition being obtained by gas chromatographic analysis), and one marketed by British Drug House Co., Ltd., under a trade name of E-7:

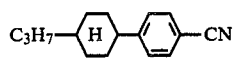 51% by weight

C$_7$H$_{15}$—⟨⟩—⟨⟩—CN 25% by weight

C$_8$H$_{17}$O—⟨⟩—⟨⟩—CN 16% by weight

-continued

| | 8% by weight |
|---|---|
| 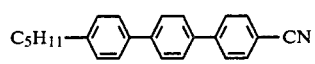 | |

As the optically active substances, there can be used chiral nematic compounds such as those obtained by introducing an optically active group such as 2-methylbutyl, 3-methylbutoxy, 3-methylpentyl, 3-methylpentoxy, 4-methylhexyl, 4-methylhexyloxy, or the like into nematic liquid crystal compounds. There may also be used alcohol derivatives such as l-menthol, d-borneol, and the like; ketone derivatives such as d-camphor, 3-methylcyclohexane, and the like; carboxylic acid derivatives such as d-citronellic acid, l-camphoric acid, and the like; aldehyde derivatives such as d-citronellal and the like; alkene derivatives such as d-linonene and the like; and other amines, amides, nitrile derivatives, etc., which as disclosed in Japanese Patent Appln Kokai (Laid-Open) No. 45546/76.

The liquid crystal composition of this invention can be used in any conventional liquid crystal display devices. Such devices usually have a structure wherein a pair of glass substrates at least one of which is transparent are placed in parallel via a spacer and transparent electrodes having desired pattern are formed on the glass substrates facing each other. In such a case, the gap between the glass substrates is determined by the spacer. The gap is usually 3 to 100 μm, and particularly preferably 5 to 50 μm from the viewpoint of practical use.

This invention is illustrated by way of the following Examples.

EXAMPLE 1

To 30 ml of N-methylpyrrolidone, 1 g of 1-amino-2-mercapto-4-hydroxyanthraquinone, 1.2 g of trans-4-n-penthylcyclohexylmethyl bromide and 0.6 g of sodium carbonate were added. The resulting mixture was heated at 120° to 125° C. for 7 hours. After cooling to 60° to 70° C., the mixture was poured on 100 g of ice, followed by separation of the product and washing with water until neutral was obtained. The product thus obtained was dried and purified by column chromatography using silica gel as carrier and chloroform as separating solvent to give 0.7 g of 1-amino-2-(trans-4-n-pentylcyclohexylmethylmercapto)-4-hydroxyanthraquinone having a melting point of 129°–130° C.

Color and order parameter (S) of the resulting anthraquinone dye were measured and shown in Table 2.

The colors and order parameters of anthraquinone dyes were measured through the Examples as follows.

To a phenylcyclohexane series liquid crystal mixture ZLI-1132 mentioned above, each pleocroic dye was added and heated at 70° C. or higher. The mixture was stirred well when it became an isotropic liquid, followed by cooling while allowed to stand and repetition of these steps in order to dissolve the dye.

The thus prepared liquid crystal composition was poured into a liquid crystal display device which was constructed by two glass substrates having thereon transparent electrodes and cured polyamide resin coating having been subjected to homogeneous orientation treatment by rubbing to contact with the liquid crystal composition, and spaced with a spacer with a gap of 10 to 100 μm, followed by sealing. When no voltage is applied, the liquid crystal composition takes a homogeneous orientation state in the display device having been subjected to orientation treatment mentioned above as shown in FIG. 1, wherein the dye molecules and the host liquid crystal molecules take the same orientation.

Absorption spectra of the thus prepared guest-host display devices were measured by using a light polarized in parallel to the orientation direction of the host liquid crystal molecules and a light polarized perpendicularly to obtain absorbances of $A_{\parallel}$ (parallel) and $A_{\perp}$ (perpendicular) of the dye molecules to each palarized light and the maximum absorption wavelength ($\lambda_m$). On obtaining the absorbances of the dyes, suitable corrections were made as to absorptions of the host liquid crystals and glass substrates as well as reflection loss of the display devices. Using the thus obtained absorbances $A_{\parallel}$ and $A_{\perp}$ of the dyes to each polarized light, the order parameter S were calculated from the following equation:

$$S = \frac{A_{\parallel} - A_{\perp}}{2A_{\perp} + A_{\parallel}}$$

EXAMPLES 2 TO 40

Dyes as listed in Table 2 were synthesized in the same manner as described in Example 1. Order parameters (S) and colors were measured and shown in Table 2.

TABLE 2

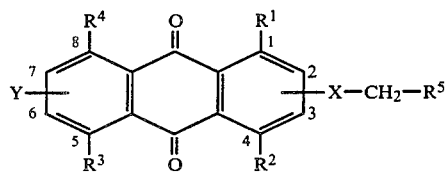

| Example | R¹ | R² | R³ | R⁴ | (position)—X—CH₂—R⁵ (position)—Y | Color | S |
|---|---|---|---|---|---|---|---|
| 1 | NH₂ | OH | H | H | (2) —S—CH₂—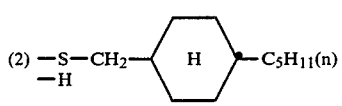—C₅H₁₁(n)<br>—H | Bluish red | 0.69 |

TABLE 2-continued

Structure:

$R^4$ at position 8, $R^1$ at position 1, Y—X— at positions 6/7, —X—CH$_2$—R$^5$ at positions 2/3, $R^3$ at position 5, $R^2$ at position 4, with C=O at 9 and 10 positions of the anthraquinone.

| Example | R$^1$ | R$^2$ | R$^3$ | R$^4$ | (position)—X—CH$_2$—R$^5$ (position)—Y | Color | S |
|---|---|---|---|---|---|---|---|
| 2 | " | " | " | " | (2) —S—CH$_2$—[cyclohexyl-H]—C$_3$H$_7$(n); —H | Bluish red | 0.70 |
| 3 | " | " | " | " | (2) —S—CH$_2$—[cyclohexyl-H]—C$_7$H$_{15}$(n); —H | Bluish red | 0.69 |
| 4 | " | " | " | " | (2) —S—CH$_2$—[cyclohexyl-H]—[cyclohexyl-H]; —H | Bluish red | 0.70 |
| 5 | " | " | " | " | (2) —S—CH$_2$—[cyclohexyl-H]—[cyclohexyl-H]—C$_3$H$_7$(n); —H | Bluish red | 0.69 |
| 6 | " | " | " | " | (2) —S—CH$_2$—[cyclohexyl-H]—[cyclohexyl-H]—C$_5$H$_{11}$(n); —H | Bluish red | 0.70 |
| 7 | " | " | " | " | (2) —S—CH$_2$—[cyclohexyl-H]—[cyclohexyl-H]—C$_7$H$_{15}$(n); —H | Bluish red | 0.70 |
| 8 | " | " | " | " | (3) —S—CH$_2$—[cyclohexyl-H]—C$_5$H$_{11}$(n); —H | Bluish red | 0.73 |
| 9 | " | " | " | " | (3) —S—CH$_2$—[cyclohexyl-H]—C$_4$H$_9$(n); —H | Bluish red | 0.74 |
| 10 | " | " | " | " | (3) —S—CH$_2$—[cyclohexyl-H]—C$_6$H$_{13}$(n); —H | Bluish red | 0.74 |
| 11 | " | " | " | " | (3) —S—CH$_2$—[cyclohexyl-H]—[cyclohexyl-H]; —H | Bluish red | 0.73 |
| 12 | " | " | " | " | (3) —S—CH$_2$—[cyclohexyl-H]—[cyclohexyl-H]—C$_3$H$_7$(n); —H | Bluish red | 0.74 |

TABLE 2-continued

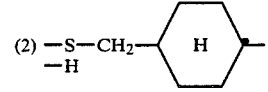

| Example | R¹ | R² | R³ | R⁴ | (position)—X—CH₂—R⁵ (position)—Y | Color | S |
|---|---|---|---|---|---|---|---|
| 13 | " | NH₂ | " | " | (2) —S—CH₂—⟨H⟩—C₄H₉(n)<br>—H | Blue | 0.67 |
| 14 | " | " | " | " | (2) —S—CH₂—⟨H⟩—C₅H₁₁(n)<br>—H | Blue | 0.69 |
| 15 | " | " | " | " | (2) —S—CH₂—⟨H⟩—C₆H₁₃(n)<br>—H | Blue | 0.68 |
| 16 | " | OH | NH₂ | OH | (2) —S—CH₂—⟨H⟩—C₃H₇(n)<br>—H | Blue | 0.70 |
| 17 | " | " | " | " | (2) —S—CH₂—⟨H⟩—C₅H₁₁(n)<br>—H | Blue | 0.70 |
| 18 | " | " | " | " | (2) —S—CH₂—⟨H⟩—C₇H₁₅(n)<br>—H | Blue | 0.71 |
| 19 | " | " | " | " | (3) —S—CH₂—⟨H⟩—C₄H₉(n)<br>—H | Blue | 0.73 |
| 20 | " | " | " | " | (3) —S—CH₂—⟨H⟩—C₆H₁₃(n)<br>—H | Blue | 0.74 |
| 21 | " | " | " | " | (3) —S—CH₂—⟨H⟩—⟨H⟩<br>—H | Blue | 0.74 |
| 22 | " | HN₂ | " | NH₂ | (2) —S—CH₂—⟨H⟩—C₃H₇(n)<br>—H | Blue | 0.73 |
| 23 | " | " | " | " | (2) —S—CH₂—⟨H⟩—C₄H₉(n)<br>—H | Blue | 0.74 |
| 24 | " | " | " | " | (2) —S—CH₂—⟨H⟩—⟨H⟩—C₃H₇(n)<br>—H | Blue | 0.75 |

TABLE 2-continued

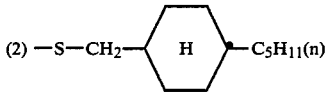

| Example | R¹ | R² | R³ | R⁴ | (position)—X—CH₂—R⁵ (position)—Y | Color | S |
|---|---|---|---|---|---|---|---|
| 25 | " | OH | " | OH | (2) —S—CH₂—⟨H⟩—C₅H₁₁(n)<br>(6) —S—CH₂—⟨H⟩—C₅H₁₁(n) | Greenish blue | 0.74 |
| 26 | " | " | " | " | (2) —S—CH₂—⟨H⟩—C₃H₇(n)<br>(6) —S—CH₂—⟨H⟩—C₇H₁₅(n) | Greenish blue | 0.74 |
| 27 | " | " | " | " | (3) —S—CH₂—⟨H⟩—C₄H₉(n)<br>(7) —S—CH₂—⟨H⟩—C₄H₉(n) | Greenish blue | 0.75 |
| 28 | " | " | " | " | (3) —S—CH₂—⟨H⟩—C₅H₁₁(n)<br>(7) —S—CH₂—⟨H⟩—C₆H₁₃(n) | Greenish blue | 0.75 |
| 29 | " | NH₂ | " | NH₂ | (2) —S—CH₂—⟨H⟩—C₅H₁₁(n)<br>(6) —S—CH₂—⟨H⟩—C₅H₁₁(n) | Greenish blue | 0.75 |
| 30 | " | " | " | " | (2) —S—CH₂—⟨H⟩—C₃H₇(n)<br>(6) —S—CH₂—⟨H⟩—C₅H₁₁(n) | Greenish blue | 0.76 |

TABLE 2-continued

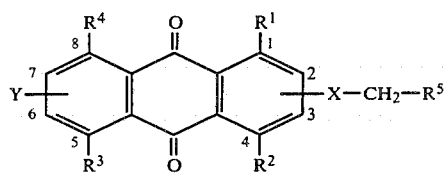

| Example | $R^1$ | $R^2$ | $R^3$ | $R^4$ | (position)—X—CH$_2$—R$^5$ (position)—Y | Color | S |
|---|---|---|---|---|---|---|---|
| 31 | " | OH | " | OH | (2) —S—CH$_2$— 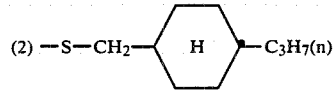 —C$_3$H$_7$(n)<br><br>(6) 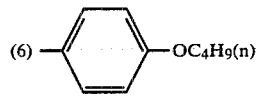 —OC$_4$H$_9$(n) | Greenish blue | 0.74 |
| 32 | " | " | " | " | (2) —S—CH$_2$— 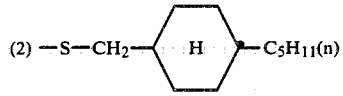 —C$_5$H$_{11}$(n)<br><br>(6) 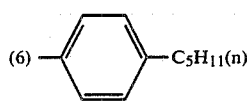 —C$_5$H$_{11}$(n) | Greenish blue | 0.75 |
| 33 | " | " | " | " | (2) —S—CH$_2$— 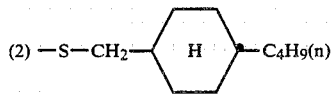 —C$_4$H$_9$(n)<br><br>(6) —O— 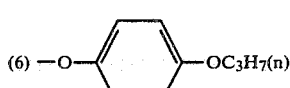 —OC$_3$H$_7$(n) | Greenish blue | 0.73 |
| 34 | " | " | " | " | (2) —S—CH$_2$— 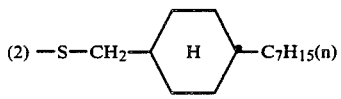 —C$_7$H$_{15}$(n)<br><br>(6) —O— 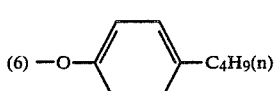 —C$_4$H$_9$(n) | Greenish blue | 0.73 |
| 35 | " | " | " | " | (3) —S—CH$_2$— 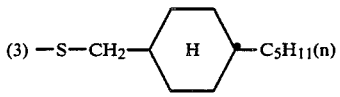 —C$_5$H$_{11}$(n)<br><br>(6) 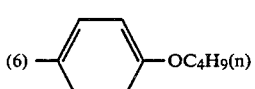 —OC$_4$H$_9$(n) | Greenish blue | 0.77 |
| 36 | " | " | " | " | (3) —S—CH$_2$— 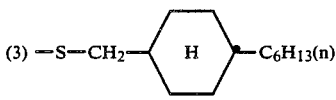 —C$_6$H$_{13}$(n)<br><br>(7) 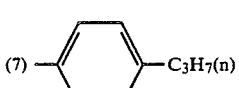 —C$_3$H$_7$(n) | Greenish blue | 0.76 |

TABLE 2-continued

Structure:

R⁴ at position 8, O at position 9 (top), R¹ at position 1
Y at position 7 (via linker), positions 6, 5, R³ at 5, O at position 10 (bottom), R² at position 4, position 3 with X—CH₂—R⁵, position 2

| Example | R¹ | R² | R³ | R⁴ | (position)—X—CH₂—R⁵ / (position)—Y | Color | S |
|---------|----|----|----|----|--------------------------------------|-------|---|
| 37 | " | " | " | " | (3) —S—CH₂—[cyclohexyl-H]—C₅H₁₁(n)<br>(7) —O—[phenyl]—OC₂H₅ | Greenish blue | 0.75 |
| 38 | " | " | " | " | (3) —S—CH₂—[cyclohexyl-H]—C₃H₇(n)<br>(7) —O—[phenyl]—C₄H₉(n) | Greenish blue | 0.75 |
| 39 | " | NH₂ | " | NH₂ | (2) —S—CH₂—[cyclohexyl-H]—C₅H₁₁(n)<br>(6) —[phenyl]—OC₆H₁₃(n) | Greenish blue | 0.77 |
| 40 | " | " | " | " | (2) —S—CH₂—[cyclohexyl-H]—C₄H₉(n)<br>(6) —O—[phenyl]—C₃H₇(n) | Greenish blue | 0.76 |

EXAMPLE 41

To 50 ml of N-methylpyrrolidone, 1.4 g of a mixture of 1-amino-2-bromo-4-hydroxyanthraquinone-6-carboxylic acid and 1-amino-2-bromo-4-hydroxyanthraquinone-7-carboxylic acid (about 1:1 by weight), 1.8 g of p-n-butylphenol and 1.8 g of potassium carbonate were added and heated at 120°–125° C. for 7 hours with stirring. After cooling to 60° to 70° C., the mixture was poured into 100 g of ice water, followed by separation of the product and washing with water until neutral was obtained. The product thus obtained was dried to give 1.5 g of a mixture of 1-amino-2-(p-n-butylphenoxy)-4-hydroxyanthraquinone-6-carboxylic acid and 1-amino-2-(p-n-butylphenoxy)-4-hydroxyanthraquinone-7-carboxylic acid.

To 30 ml of o-dichlorobenzene, 1.0 g of the mixture thus obtained, 1.8 g of trans-4-n-butylcyclohexanol and 0.2 g of p-toluenesulfonic acid were added and heated at 110° to 115° C. for 24 hours with stirring. After removing the o-dichlorobenzene by distillation under reduced pressure, the residue was purified by column chromatography using silica gel as carrier and chloroform as separating solvent to give 0.5 g of a 1:1 mixture of 1-amino-2-(p-n-butylphenoxy)-4-hydroxy-6-carboxylic acid trans-4-n-butylcyclohexyl ester and 1-amino-2-(p-n-butylphenoxy)-4-hydroxy-7-carboxylic acid trans-4-n-butylcyclohexyl ester.

The resulting mixture had a maximum absorption wavelength in visible region of 534 nm and an order parameter (S) of 0.74.

Further, 0.45 g of the mixture mentioned above was separated and purified by column chromatography using silica gel (C-200, a trade name, manufactured by Wako Pure Chemical Industries, Ltd.) as carrier and toluene as separating solvent. Initially, 0.2 g of a dye No. 41a (fraction a) having a melting point of 193° to 194° C. was separated and then 0.2 g of a dye No. 41b (fraction b) having a melting point of 152° to 153° C. was separated. Maximum absorption wavelengths of these dyes in visible region were measured in the same manner as mentioned above.

That.is, the dye No. 41a in an amount of 0.39% by weight was added to a liquid crystal mixture ZLI-1132 to prepare a liquid crystal composition. The liquid crystal composition was sealed in a display device having a gap of 50 μm between the two substrates. Absorption spectra were measured as mentioned above. The maximum absorption wavelength in visible region was 535 nm as shown in FIG. 3 and $A_{\|}$ at the maximum absorption wavelength was 1.328 and $A_\perp$ at the maximum absorption wavelength was 0.152. Therefore, the order parameter (S) became 0.72.

On the other hand, the dye No. 41b in an amount of 1.05% by weight was added to a liquid crystal mixture ZLI-1132 to prepare a liquid crystal composition. The liquid crystal composition was sealed in a display device having a gap of 10 μm between the two substrates. Absorption spectra were measured as mentioned above. The maximum absorption wavelength in visible region was 534 nm as shown in FIG. 4 and $A_{\|}$ at the maximum absorption wavelength was 0.532 and $A_\perp$ at the maximum absorption wavelength was 0.051. Therefore, the order parameter (S) became 0.76.

EXAMPLES 42 TO 44

Dyes shown in Table 3 were prepared in the same manner as described in Example 41. Melting points, maximum absorption wavelengths and order parameters (S) of the resulting mixtures and separated isomers in the same manner as described in Example 41 were measured and listed in Table 3.

TABLE 3

| Example No. | $R^7$ | (position) —O—⌬—$R^{11}$ | —COOR$^6$ | | Melting point (°C.) | Maximum absorption wavelength (nm) | S |
|---|---|---|---|---|---|---|---|
| 42 | H | (2) —O—⌬—C$_7$H$_{15}$(n) | —COO—⌬—C$_4$H$_9$(n) | 1:1 Mixture of isomers (6- or 7- position) | — | 536 | 0.76 |
| | | | | Fraction a | 185–186 | 536 | 0.73 |
| | | | | Fraction b | 145–146 | 535 | 0.78 |
| 43 | H | (2) —O—⌬—C$_4$H$_9$(n) | —COO—⌬—C$_8$H$_{17}$(n) | 1:1 Mixture of isomers (6- or 7- position) | — | 536 | 0.76 |
| | | | | Fraction a | 170–172 | 536 | 0.74 |
| | | | | Fraction b | 134–135 | 535 | 0.77 |
| 44 | H | (2) —O—⌬—C$_4$H$_9$(n) | —COO—⌬—C$_4$H$_9$(n) | 1:1 Mixture of isomers (6- or 7- position) | — | 539 | 0.72 |
| | | | | Fraction a | 160–162 | 539 | 0.67 |
| | | | | Fraction b | 180–181 | 539 | 0.77 |

EXAMPLES 45 TO 77

Dyes shown in Table 4 were prepared in the same manner as described in Example 41. Maximum absorption wave lengths and order parameters (S) of these dyes (1:1 mixture of isomers having —COOR$^6$ at the 6-position or 7-position) were measured and listed in Table 4.

TABLE 4

Structure: Anthraquinone with positions 1-NHR⁷, 2-O-phenyl-R¹¹ₘ, 4-OH, and R⁶OOC at 6 or 7 position, with carbonyls at 9,10.

| Example No. | —NHR⁷ | (position) —O—phenyl—R¹¹ₘ | —COOR⁶ [1:1 Mixture of isomers (6- or 7-position)] | Maximum absorption wavelength (nm) | S |
|---|---|---|---|---|---|
| 45 | —NH₂ | (2) —O—C₆H₄—C₄H₉(n) | —COO—C₆H₁₀(H)—C₅H₁₁(n) | 534 | 0.74 |
| 46 | —NH₂ | (2) —O—C₆H₄—C₅H₁₁(n) | —COO—C₆H₁₀(H)—C₆H₁₃(n) | 534 | 0.75 |
| 47 | —NH₂ | (2) —O—C₆H₄—C₅H₁₁(n) | —COO—C₆H₁₀(H)—C₃H₇(n) | 534 | 0.74 |
| 48 | —NH₂ | (2) —O—C₆H₄—C₆H₁₃(n) | —COO—C₆H₁₀(H)—C₇H₁₅(n) | 535 | 0.75 |
| 49 | —NH₂ | (2) —O—C₆H₄—C₄H₉(n) | —COO—C₆H₁₀(H)—C₄H₉(n) | 536 | 0.69 |
| 50 | —NH₂ | (3) —O—C₆H₄—C₃H₇(n) | —COO—C₆H₁₀(H)—C₇H₁₅(n) | 544 | 0.77 |
| 51 | —NH₂ | (3) —O—C₆H₄—C₄H₉(n) | —COO—C₆H₁₀(H)—C₆H₁₃(n) | 544 | 0.76 |
| 52 | —NHC₄H₉(n) | (2) —O—C₆H₄—C₄H₉(n) | —COO—C₆H₁₀(H)—C₅H₁₁(n) | 560 | 0.72 |
| 53 | —NH—C₆H₁₀(H) | (2) —O—C₆H₄—C₃H₇(n) | —COO—C₆H₁₀(H)—C₅H₁₁(n) | 560 | 0.71 |
| 54 | —NH—C₆H₅ | (2) —O—C₆H₄—C₃H₇(n) | —COO—C₆H₁₀(H)—C₆H₁₃(n) | 556 | 0.71 |
| 55 | —NH₂ | (2) —O—C₆H₄—C₄H₉(n) | —COO—C₆H₄—C₄H₉(n) | 535 | 0.74 |
| 56 | —NH₂ | (2) —O—C₆H₄—C₃H₇(n) | —COO—C₆H₄—C₇H₁₅(n) | 534 | 0.74 |
| 57 | —NH₂ | (2) —O—C₆H₄—OCH₃ | —COO—C₆H₄—C₈H₁₇(n) | 534 | 0.73 |
| 58 | —NH₂ | (3) —O—C₆H₄—C₅H₁₁(n) | —COO—C₆H₄—OC₄H₉(n) | 545 | 0.76 |
| 59 | —NH₂ | (2) —O—C₆H₄—C₄H₉(n) | —COOC₈H₁₇(n) | 534 | 0.72 |
| 60 | —NH₂ | (2) —O—C₆H₄—C₅H₁₁(n) | —COOC₂H₄OC₄H₉(n) | 534 | 0.70 |
| 61 | —NH₂ | (2) —O—C₆H₄—CH₂OC₃H₇(n) | —COO—C₆H₁₀(H)—C₃H₇(n) | 534 | 0.74 |

TABLE 4-continued

Structure:

$R^6OOC$ attached at 6- or 7-position of anthraquinone core with 1-NHR$^7$, 2-O-aryl (R$^{11}_m$), 4-OH, 9,10-dione.

| Example No. | —NHR$^7$ | (position) —O—⟨C$_6$H$_4$⟩—R$^{11}_m$ | —COOR$^6$ [1:1 Mixture of isomers (6- or 7-position)] | Maximum absorption wavelength (nm) | S |
|---|---|---|---|---|---|
| 62 | —NH$_2$ | (2) —O—⟨Ph⟩—⟨H⟩—C$_3$H$_7$(n) | —COO—⟨H⟩—C$_4$H$_9$(n) | 534 | 0.74 |
| 63 | —NH$_2$ | (2) —O—⟨Ph⟩—⟨Ph⟩—OC$_2$H$_5$ | —COO—⟨H⟩—C$_3$H$_7$(n) | 534 | 0.75 |
| 64 | —NH$_2$ | (2) —O—⟨Ph⟩—OCH$_2$—⟨H⟩—C$_3$H$_7$(n) | —COO—⟨H⟩—C$_3$H$_7$(n) | 535 | 0.74 |
| 65 | —NH$_2$ | (2) —O—⟨Ph⟩—OCH$_2$—⟨Ph⟩—OCH$_3$ | —COO—⟨Ph with C$_2$H$_5$⟩ | 534 | 0.72 |
| 66 | —NH$_2$ | (2) —O—⟨Ph⟩—O—⟨Ph⟩ | —COO—⟨H⟩—⟨H⟩ | 535 | 0.73 |
| 67 | —NH$_2$ | (2) —O—⟨Ph⟩—CH$_2$—⟨Ph⟩ | —COO—⟨H⟩—C$_5$H$_{11}$(n) | 535 | 0.73 |
| 68 | —NH$_2$ | (2) —O—⟨Ph⟩—C$_2$H$_5$ | —COO—⟨Ph⟩—CH$_2$OC$_4$H$_9$(n) | 534 | 0.74 |
| 69 | —NH$_2$ | (2) —O—⟨Ph⟩—C$_3$H$_7$(n) | —COO—⟨Ph⟩—⟨H⟩—C$_5$H$_{11}$(n) | 534 | 0.75 |
| 70 | —NH$_2$ | (2) —O—⟨Ph⟩—C$_4$H$_9$(n) | —COO—⟨Ph⟩—⟨Ph⟩—C$_3$H$_7$(n) | 534 | 0.75 |
| 71 | —NH$_2$ | (2) —O—⟨Ph⟩—C$_3$H$_7$(n) | —COO—⟨Ph⟩—OCH$_2$—⟨H⟩—C$_5$H$_{11}$(n) | 534 | 0.74 |
| 72 | —NH$_2$ | (2) —O—⟨Ph with C$_4$H$_9$(n)⟩ | —COO—⟨Ph⟩—OCH$_2$—⟨H⟩—C$_3$H$_7$(n) | 535 | 0.74 |
| 73 | —NH$_2$ | (2) —O—⟨Ph⟩—F | —COO—⟨H⟩—⟨H⟩—C$_3$H$_7$(n) | 543 | 0.74 |
| 74 | —NH$_2$ | (2) —O—⟨Ph with CH$_3$⟩—Cl | —COO—⟨Ph⟩—C$_4$H$_9$(n) | 539 | 0.73 |
| 75 | —NH$_2$ | (2) —O—⟨Ph with 2 CH$_3$⟩—CH$_3$ | —COO—⟨H⟩—C$_5$H$_{11}$(n) | 534 | 0.72 |

TABLE 4-continued

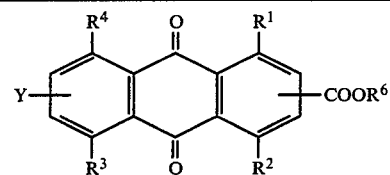

| Example No. | —NHR⁷ | (position) —O—⟨phenyl⟩—$R_m^{11}$ | —COOR⁶ [1:1 Mixture of isomers (6- or 7-position)] | Maximum absorption wavelength (nm) | S |
|---|---|---|---|---|---|
| 76 | $-NH_2$ | (2) —O—⟨phenyl⟩—$N(CH_3)_2$ | —COO—⟨H⟩—$C_6H_{13}(n)$ | 540 | 0.65 |
| 77 | $-NH_2$ | (2) —O—⟨phenyl⟩—$C_4H_9(n)$ | —COO—⟨phenyl⟩—Cl | 534 | 0.73 |

EXAMPLES 78 TO 101

Colors and order parameters (S) of dyes liested in Table 5 were measured and listed in Table 5.

TABLE 5

Structure: anthraquinone with $R^1$ (1-pos), $R^2$ (4-pos), $R^3$ (5-pos), $R^4$ (8-pos), —COOR⁶, and Y substituents.

| Example No. | $R^1$ | $R^2$ | $R^3$ | $R^4$ | (position) —COOR⁶ / (position) —Y | Color | S |
|---|---|---|---|---|---|---|---|
| 78 | $-NH_2$ | $-OH$ | $-NH_2$ | $-OH$ | (2) —COO—⟨H⟩—$C_7H_{15}(n)$ / —H | Blue | 0.75 |
| 79 | " | " | " | " | (2) —COO—$C_7H_{15}(n)$ / —H | Blue | 0.68 |
| 80 | " | " | " | " | (2) —COO—⟨phenyl⟩—⟨H⟩—$C_3H_7(n)$ / —H | Blue | 0.76 |
| 81 | " | " | " | " | (2) —COO—$C_2H_4OC_2H_5$ / —H | Blue | 0.67 |
| 82 | " | " | " | " | (2) —COO—⟨H⟩—⟨H⟩—$C_5H_{11}(n)$ / —H | Blue | 0.75 |
| 83 | " | " | " | " | (3) —COO—⟨phenyl⟩—⟨phenyl⟩—$OC_3H_7(n)$ / —H | Blue | 0.76 |
| 84 | " | " | " | " | (2) —COO—⟨phenyl⟩—$OCH_2$—⟨H⟩—$C_5H_{11}(n)$ / —H | Blue | 0.75 |
| 85 | " | " | " | " | (3) —COO—⟨phenyl⟩—$OCH_2$—⟨phenyl⟩—$OCH_3$ / —H | Blue | 0.75 |

TABLE 5-continued

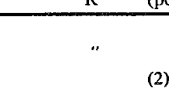

| Example No. | $R^1$ | $R^2$ | $R^3$ | $R^4$ | (position) —COOR⁶ (position) —Y | Color | S |
|---|---|---|---|---|---|---|---|
| 86 | " | " | " | " | (2) —COO—⟨H⟩—C₄H₉(n)<br>(6) —Br | Blue | 0.77 |
| 87 | " | " | " | " | (2) —COO—⟨H⟩—C₅H₁₁(n)<br>(6) —S—C₄H₉(n) | Blue | 0.78 |
| 88 | " | " | " | " | (3) —COO—⟨H⟩—C₆H₁₃(n)<br>(7) —S—⟨⟩—C₈H₁₇(n) | Blue | 0.77 |
| 89 | " | " | " | " | (2) —COO—⟨H⟩—C₄H₉(n)<br>(6) —O—⟨⟩—C₇H₁₅(n) | Blue | 0.78 |
| 90 | " | " | " | " | (2) —COO—⟨H⟩—C₇H₁₅(n)<br>(6) —OC₈H₁₇(n) | Blue | 0.77 |
| 91 | H<br>—NC₄H₉(n) | " | H<br>—NC₄H₉(n) | " | (2) —COO—⟨H⟩—C₈H₁₇(n)<br>—H | Greenish blue | 0.73 |
| 92 | —NH₂ | " | —NH₂ | " | (2) —COO—⟨H⟩—C₃H₇(n)<br>(6) —S—CH₂—⟨⟩—OC₄H₉(n) | Blue | 0.76 |
| 93 | " | " | " | " | (3) —COO—⟨H⟩—C₇H₁₅(n)<br>(7) —COO—⟨H⟩—C₇H₁₅(n) | Blue | 0.76 |
| 94 | " | " | " | " | (2) —COO—⟨H⟩—C₄H₉(n)<br>(6) —COO—⟨H⟩—C₄H₉(n) | Blue | 0.77 |
| 95 | " | —NH₂ | " | —NH₂ | (2) —COO—⟨H⟩—C₄H₉(n)<br>(6) —O—⟨⟩—C₃H₇(n) | Blue | 0.79 |
| 96 | " | " | " | " | (2) —COO—⟨H⟩—C₅H₁₁(n)<br>(6) —S—⟨⟩—CH₃ | Blue | 0.78 |

TABLE 5-continued

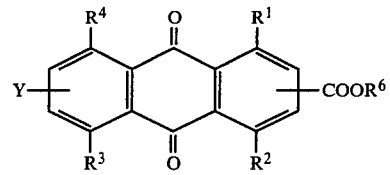

| Example No. | R¹ | R² | R³ | R⁴ | (position) —COOR⁶ (position) —Y | Color | S |
|---|---|---|---|---|---|---|---|
| 97 | " | " | " | " | (2) —COO—⟨H⟩—$C_6H_{13}(n)$<br>(6) —COO—⟨H⟩—$C_6H_{13}(n)$ | Blue | 0.80 |
| 98 | " | —H | " | —H | (2) —COO—⟨H⟩—$C_3H_7(n)$<br>(6) —COO—⟨H⟩—$C_3H_7(n)$ | Yellowish red | 0.76 |
| 99 | " | " | " | " | (2) —COO—⟨H⟩—$C_3H_7(n)$<br>(6) —S—⟨⟩—$CH_3$ | Yellowish red | 0.77 |
| 100 | —OH | " | —OH | " | (2) —COO—⟨H⟩—$C_7H_{15}(n)$<br>(6) —COO—⟨H⟩—$C_7H_{15}(n)$ | Yellow | 0.75 |
| 101 | " | " | " | " | (2) —COO—⟨H⟩—$C_7H_{15}(n)$<br>(6) —S—⟨⟩—$C_8H_{17}(n)$ | Yellow | 0.74 |

EXAMPLES 102 TO 125

Colors and order parameters (S) of dyes listed in Table 6 were measured and listed in Table 6.

TABLE 6

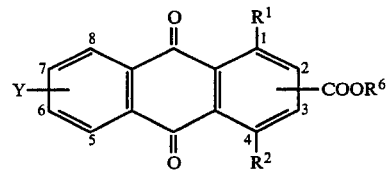

| Example No. | R¹ | R² | (position) —COOR⁶ (position) —Y | Color | S |
|---|---|---|---|---|---|
| 102 | —$NH_2$ | —$NH_2$ | (2) —COO—⟨H⟩—$C_4H_9(n)$<br>(6) —Cl | Blue | 0.78 |
| 103 | " | " | (2) —$COOC_8H_{17}(n)$<br>(6) —Br | Blue | 0.72 |
| 104 | " | " | (2) —COO—⟨⟩—⟨H⟩—$C_5H_{11}(n)$<br>(6) —Cl | Blue | 0.79 |

TABLE 6-continued

| Example No. | R¹ | R² | (position) —COOR⁶ (position) —Y | Color | S |
|---|---|---|---|---|---|
| 105 | ″ | ″ | (2) —COO—⟨H⟩—C₅H₁₁(n)<br>(6) —COO—⟨H⟩—C₅H₁₁(n) | Blue | 0.79 |
| 106 | ″ | ″ | (2) —COO—CH₂CH₂OC₄H₉(n)<br>(6) —Br | Blue | 0.72 |
| 107 | ″ | ″ | (2) —COO—⟨⟩—C₄H₉(n)<br>(6) —Cl | Blue | 0.79 |
| 108 | ″ | ″ | (2) —COO—⟨H⟩—⟨H⟩—C₃H₇(n)<br>(7) —Cl | Blue | 0.80 |
| 109 | ″ | ″ | (2) —COO—⟨⟩—⟨⟩—OC₄H₉(n)<br>(6) —Br | Blue | 0.79 |
| 110 | ″ | ″ | (2) —COO—⟨⟩—OCH₂—⟨H⟩—C₃H₇(n)<br>(7) —Cl | Blue | 0.79 |
| 111 | ″ | ″ | (2) —COO—⟨⟩—OCH₂—⟨⟩—OC₄H₉(n)<br>(6) —Cl | Blue | 0.79 |
| 112 | ″ | ″ | (2) —COO—⟨H⟩—C₆H₁₃(n)<br>(7) —S—C₈H₁₇(n) | Blue | 0.78 |
| 113 | ″ | ″ | (2) —COO—⟨H⟩—C₇H₁₅(n)<br>(6) —O—C₇H₁₅(n) | Blue | 0.78 |
| 114 | ″ | ″ | (2) —COO—⟨H⟩—C₄H₉(n)<br>(6) —S—⟨⟩—C₈H₁₇(n) | Blue | 0.78 |
| 115 | ″ | ″ | (2) —COO—⟨H⟩—C₃H₇(n)<br>(6) —O—⟨⟩—C₄H₉(n) | Blue | 0.80 |
| 116 | ″ | ″ | (2) —COO—⟨H⟩—C₄H₉(n)<br>(6) —CO—⟨⟩—C₂H₅ | Blue | 0.78 |

TABLE 6-continued

| Example No. | R¹ | R² | (position) —COOR⁶ (position) —Y | Color | S |
|---|---|---|---|---|---|
| 117 | " | " | (2) —COO—⟨H⟩—C₅H₁₁(n)<br>(6) —CH₂—⟨⟩—C₂H₅ | Blue | 0.77 |
| 118 | " | —NHC₄H₉(n) | (2) —COO—⟨H⟩—C₄H₉(n)<br>(6) —Cl | Greenish blue | 0.75 |
| 119 | " | —NH—⟨⟩—C₄H₉(n) | (2) —COO—⟨H⟩—C₄H₉(n)<br>(6) —Cl | Greenish blue | 0.76 |
| 120 | —OH | —OH | (2) —COO—⟨H⟩—C₄H₉(n)<br>(6) —Cl | Reddish Yellow | 0.74 |
| 121 | " | —NH₂ | (2) —COO—⟨H⟩—C₄H₉(n)<br>(6) —Cl | Bluish red | 0.77 |
| 122 | " | —NH—⟨⟩—C₄H₉(n) | (2) —COO—⟨H⟩—C₅H₁₁(n)<br>(6) —Cl | Reddish blue | 0.74 |
| 123 | " | —NHC₂H₄—⟨⟩ | (2) —COO—⟨H⟩—C₇H₁₅(n)<br>(6) —S—⟨⟩—CH₃ | Reddish blue | 0.72 |
| 124 | —NH₂ | —OH | (2) —COO—⟨H⟩—C₅H₁₁(n)<br>(6) —Cl | Bluish red | 0.75 |
| 125 | —NH—⟨H⟩ | " | (2) —COO—⟨H⟩—C₄H₉(n)<br>(6) —Cl | Reddish blue | 0.73 |

What is claimed is:

1. A liquid crystal composition comprising a host liquid crystal material and at least one quest anthraquinone dye dissolved in the host liquid crystal material, wherein at least one of the at least one anthraquinone dye is represented by the formula:

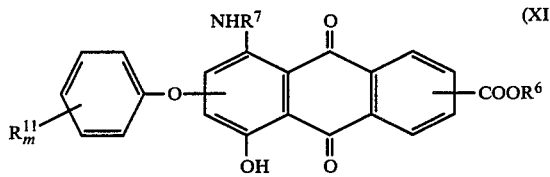

(XIX)

wherein $R^7$ is hydrogen, an alkyl group, a cycloalkyl group, an aryl group or an aralkyl group, where said aryl group is

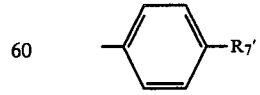

wherein $R'_7$ is hydrogen, a $C_{1-9}$ alkyl group either unsubstituted or substituted with an alkoxy group, a $C_{1-9}$ alkoxy group, and a cycloalkyl group either unsubstituted or substituted with an alkyl group, and where said aralkyl group is

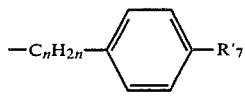

where n is an integer of 1 to 9; $R^6$ is a $C_{1-9}$ alkyl group which may be substituted with an alkoxy group,

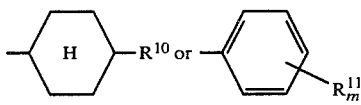

$R^{10}$ is hydrogen, a $C_{1-9}$ alkyl group, a $C_{1-9}$ alkoxy group, a cycloalkyl group which may be substituted with an alkyl group; $R^{11}$ is hydrogen, a $C_{1-9}$ alkyl group which may be substituted with an alkoxy group, a $C_{1-9}$ alkoxy group,

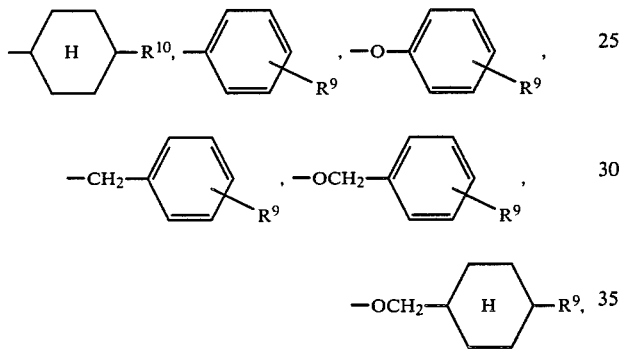

a halogen or a dialkylamino group; $R^9$ is hydrogen, a $C_{1-9}$ alkyl group which may be substituted with an alkoxy group, or a $C_{1-9}$ alkoxy group; and m is 1 to 3.

2. A composition according to claim 1, wherein in the formula (XIX) $R^7$ is hydrogen; $R^6$ is a $C_{1-9}$ alkyl group which may be substituted with an alkoxy group,

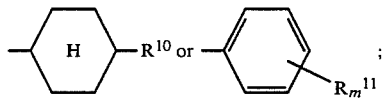

$R^{10}$ is hydrogen, a $C_{1-9}$ alkyl group, a cycloalkyl group which may be substituted with an alkyl group; $R^{11}$ is a $C_{1-9}$ alkyl group which may be substituted with an alkoxy group, a $C_{1-9}$ alkoxy group,

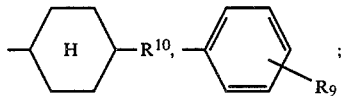

$R^9$ is hydrogen, a $C_{1-9}$ alkyl group which may be substituted with an alkoxy group or a $C_{1-9}$ alkoxy group; and m is 1 to 3.

3. A composition according to claim 1, wherein in the formula (XIX) $R^7$ is hydrogen; $R^6$ is

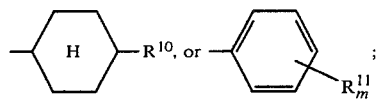

$R^{10}$ is $C_{1-9}$ alkyl group; $R^{11}$ is a $C_{1-9}$ alkyl group which may be substituted with an alkoxy group, or a $C_{1-9}$ alkoxy group; and m is 1 to 3.

4. A pleochroic anthraquinone dye of the formula:

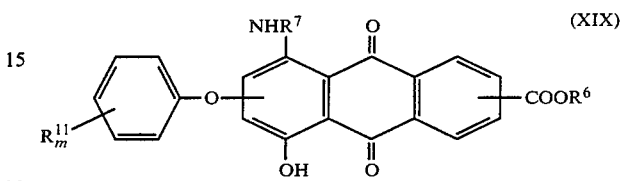

wherein $R^7$ is hydrogen, an alkyl group, a cycloalkyl group, an aryl group or an aralkyl group, where said aryl group is

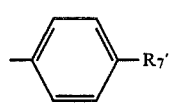

wherein $R'_7$ is hydrogen, a $C_{1-9}$ alkyl group either unsubstituted or substituted with an alkoxy group, a $C_{1-9}$ alkoxy group, and a cycloalkyl group either unsubstituted or substituted with an alkyl group, and where said aralkyl group is

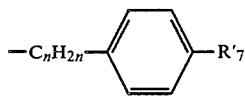

where n is an integer of 1 to 9; $R^6$ is a $C_{1-9}$ alkyl group which may be substituted with an alkoxy group,

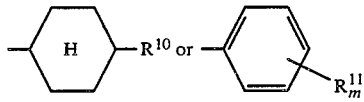

$R^{10}$ is hydrogen, a $C_{1-9}$ alkyl group, a $C_{1-9}$ alkoxy group, a cycloalkyl group which may be substituted with an alkyl group; $R^{11}$ is hydrogen, a $C_{1-9}$ alkyl group which may be substituted with an alkoxy group, a $C_{1-9}$ alkoxy group,

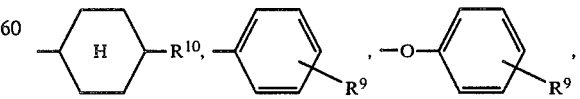

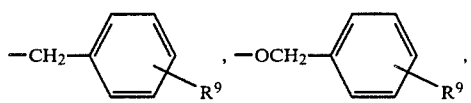

-continued

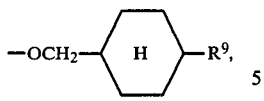

a halogen or a dialkylamino group; $R^9$ is hydrogen, a $C_{1-9}$ alkyl group which may be substituted with an alkoxy group, or a $C_{1-9}$ alkoxy group; and m is 1 to 3.

5. A dye according to claim 4, wherein in the formula (XIX) $R^7$ is hydrogen; $R^6$ is a $C_{1-9}$ alkyl group which may be substituted with an alkoxy group,

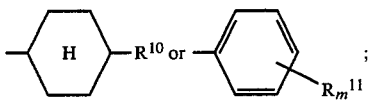

$R^{10}$ is hydrogen, a $C_{1-9}$ alkyl group, a $C_{1-9}$ alkoxy group, a cycloalkyl group which may be substituted with an alkyl group; $R^{11}$ is a $C_{1-9}$ alkyl group which may be substituted with an alkoxy group, a $C_{1-9}$ alkoxy group,

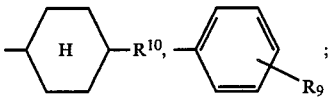

$R^9$ is hydrogen, a $C_{1-9}$ alkyl group which may be substituted with an alkoxy group or a $C_{1-9}$ alkoxy group; and m is 1 to 3.

6. A dye according to claim 4, wherein in the formula (XIX) $R^7$ is hydrogen; $R^6$ is

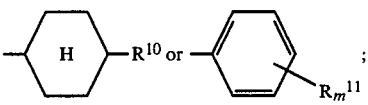

$R^{10}$ is a $C_{1-9}$ alkyl group; $R^{11}$ is a $C_{1-9}$ alkyl group which may be substituted with an alkoxy group or a $C_{1-9}$ alkoxy group; and m is 1 to 3.

7. A composition according to claim 1, wherein said liquid crystal material is a mixture of liquid crystals of:

| | |
|---|---|
| $C_3H_7$—⟨H⟩—⟨⟩—CN | 38.4% by weight |
| $C_5H_{11}$—⟨H⟩—⟨⟩—CN | 34.2% by weight |
| $C_7H_{15}$—⟨H⟩—⟨⟩—CN | 18.1% by weight |
| $C_5H_{11}$—⟨H⟩—⟨⟩—⟨⟩—CN | 9.3% by weight. |

8. A composition according to claim 1, wherein said liquid crystal material is a mixture of liquid crystals of:

| | |
|---|---|
| $C_5H_{11}$—⟨⟩—⟨⟩—CN | 51% by weight |
| $C_7H_{15}$—⟨⟩—⟨⟩—CN | 25% by weight |
| $C_8H_{17}O$—⟨⟩—⟨⟩—CN | 16% by weight |
| $C_5H_{11}$—⟨⟩—⟨⟩—⟨⟩—CN | 8% by weight. |

9. A composition according to claim 1, wherein the liquid crystal material is a nematic liquid crystal.

10. A composition according to claim 1, wherein the liquid crystal material has at least one optically active substance added thereto such that the liquid crystal material can take a cholesteric state.

11. A composition according to claim 1, wherein the anthraquinone dye is

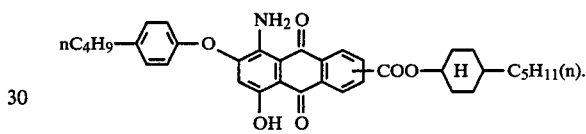

12. A composition according to claim 1, wherein the anthraquinone dye is represented by the formula:

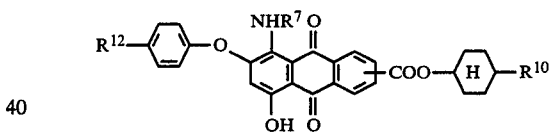

wherein $R^{10}$ is a $C_{1-9}$ alkyl group, $R^{12}$ is a $C_{1-9}$ alkyl group, and $R^7$ is hydrogen, an alkyl group, a cycloalkyl group or a phenyl group.

13. A composition according to claim 12, wherein $R^7$ is hydrogen.

14. A composition according to claim 1, wherein $R^6$ is

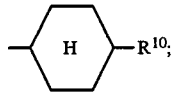

$R^7$ is hydrogen, an alkyl group, a cycloalkyl group or a phenyl group; $R^{10}$ is hydrogen, a $C_{1-9}$ alkyl group, a $C_{1-9}$ alkoxy group, or a cycloalkyl group; $R^{11}$ is hydrogen, a $C_{1-9}$ alkyl group which is either unsubstituted or substituted with an alkoxy group, a $C_{1-9}$ alkoxy group,

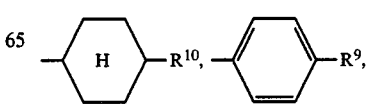

-continued

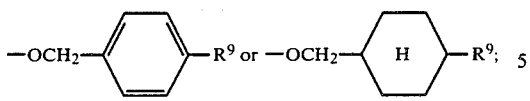

$R^9$ is hydrogen, a $C_{1-9}$ alkyl group, a $C_{1-9}$ alkoxy group or a cycloalkyl group; and m is 1 to 3.

15. A composition according to claim 14, wherein $R^{10}$ is a $C_{1-9}$ alkyl group; $R^{11}$ is a $C_{1-9}$ alkyl group; and m is 1 or 2.

16. A dye according to claim 4, represented by the formula:

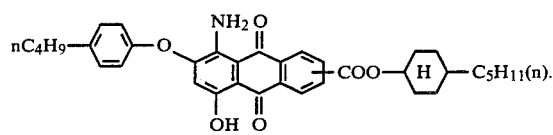

17. A dye according to claim 4, represented by the formula:

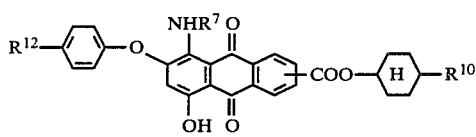

wherein $R^{10}$ is a $C_{1-9}$ alkyl group, $R^{12}$ is a $C_{1-9}$ alkyl group, and $R^7$ is hydrogen, an alkyl group, a cycloalkyl group or a phenyl group.

18. A dye according to claim 17, wherein $R^7$ is hydrogen.

19. A dye according to claim 4, wherein $R^6$ is

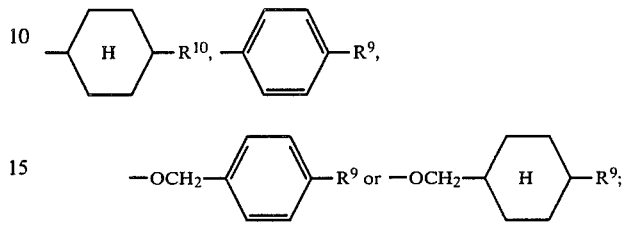

$R^7$ is hydrogen, an alkyl group, a cycloalkyl group or a phenyl group; $R^{10}$ is hydrogen, a $C_{1-9}$ alkyl group, a $C_{1-9}$ alkoxy group, or a cycloalkyl group; $R^{11}$ is hydrogen, a $C_{1-9}$ alkyl group which is either unsubstituted or substituted with an alkoxy group, a $C_{1-9}$ alkoxy group,

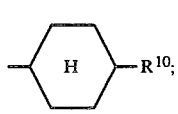

$R^9$ is hydrogen, a $C_{1-9}$ alkyl group, a $C_{1-9}$ alkoxy group or a cycloalkyl group; and m is 1 to 3.

20. A dye according to claim 19, wherein $R^{10}$ is a $C_{1-9}$ alkyl group; $R^{11}$ is a $C_{1-9}$ alkyl group; and m is 1 or 2.

* * * * *